(12) United States Patent
Kazmi et al.

(10) Patent No.: US 8,995,331 B2
(45) Date of Patent: Mar. 31, 2015

(54) RELAYING IN MIXED LICENSED AND UNLICENSED CARRIER AGGREGATION

(75) Inventors: Muhammad Kazmi, Bromma (SE); Gabor Fodor, Hässelby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/824,773

(22) PCT Filed: Sep. 21, 2010

(86) PCT No.: PCT/SE2010/051013
§ 371 (c)(1),
(2), (4) Date: Mar. 18, 2013

(87) PCT Pub. No.: WO2012/039656
PCT Pub. Date: Mar. 29, 2012

(65) Prior Publication Data
US 2013/0188552 A1    Jul. 25, 2013

(51) Int. Cl.
*H04W 88/04* (2009.01)
*H04L 5/00* (2006.01)
*H04W 16/14* (2009.01)

(52) U.S. Cl.
CPC ............... *H04W 88/04* (2013.01); *H04L 5/001* (2013.01); *H04W 16/14* (2013.01)
USPC ............................ 370/315; 370/252; 370/329

(58) Field of Classification Search
CPC ...... H04L 5/001; H04W 16/14; H04W 72/04; H04W 88/04
USPC ..................................... 370/329, 345; 455/450
See application file for complete search history.

(56) References Cited

U.S. PATENT DOCUMENTS

| 2004/0063451 | A1* | 4/2004 | Bonta et al. ................... 455/519 |
| 2005/0239453 | A1 | 10/2005 | Vikberg et al. |
| 2007/0153729 | A1* | 7/2007 | Alapuranen .................. 370/329 |
| 2007/0232312 | A1 | 10/2007 | Gallagher et al. |
| 2008/0107095 | A1* | 5/2008 | Black et al. ................... 370/342 |
| 2008/0220787 | A1* | 9/2008 | Stanwood et al. ............ 455/450 |
| 2008/0220788 | A1* | 9/2008 | Stanwood et al. ............ 455/450 |
| 2009/0061877 | A1 | 3/2009 | Gallagher et al. |
| 2012/0113839 | A1* | 5/2012 | Etemad ......................... 370/252 |

(Continued)

FOREIGN PATENT DOCUMENTS

| EP | 1 734 774 A1 | 12/2006 |
| KR | 2010/0069063 A | 6/2010 |
| WO | WO 2006/012909 A1 | 2/2006 |

OTHER PUBLICATIONS

Vasilakopoulou, et al. Design and Implementation of the Hiperlan/2 Protocol. Sigmobile Mobile Computing and Communications Review, vol. 7, No. 2, pp. 20-32, ACM, New York, USA, 2003.
Zetterberg, K. High Speed Downlink Shared Channel in Unlicensed Frequency Bands. Master Thesis, Linköpings University, 2004.
Shoemake, M. WiFi (IEEE 802.1 1b) and Bluetooth Coexistence Issues and Solutions for the 2.4 GHz ISM Band. White Paper, Texas Instruments. Feb. 2001.

(Continued)

*Primary Examiner* — Edan Orgad
*Assistant Examiner* — Emmanuel Maglo

(57) ABSTRACT

A radio access network comprises a radio access network node and plural wireless terminals. At least a first wireless terminal is configured to utilize mixed carrier aggregation. A relay node transmits an unlicensed component carrier allocated to the first wireless terminal between the radio access network node and the first wireless terminal. The relay node may relay uplink data, downlink data, or both.

22 Claims, 17 Drawing Sheets

(56) References Cited

U.S. PATENT DOCUMENTS

2012/0163254 A1* 6/2012 Stanwood et al. ............ 370/280
2012/0250631 A1* 10/2012 Hakola et al. ................ 370/329
2013/0315152 A1* 11/2013 Ratasuk et al. ............... 370/329
2013/0329711 A1* 12/2013 Seo et al. ...................... 370/336

OTHER PUBLICATIONS

Doppler, M. et al. Device-to-Device Communications as an Underlay to LTE-Advanced Networks. IEEE Communications Magazine, pp. 42-49, vol. 47, No. 12, Dec. 2009.

* cited by examiner

RELAYING IN MIXED LICENSED AND UNLICENSED CARRIER AGGREGATION

TECHNICAL FIELD

The present invention generally relates to telecommunications, and particularly to carrier aggregation of licensed and unlicensed carriers.

BACKGROUND

In a typical cellular radio system, wireless terminals (also known as mobile stations and/or user equipment units (UEs)) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions of the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM). UTRAN is essentially a radio access network using wideband code division multiple access for user equipment units (UEs).

In a forum known as the Third Generation Partnership Project (3GPP), telecommunications suppliers propose and agree upon standards for third generation networks and UTRAN specifically. Specifications for the Evolved Universal Terrestrial Radio Access Network (E-UTRAN) were developed within the $3^{rd}$ Generation Partnership Project (3GPP). The Evolved Universal Terrestrial Radio Access Network (E-UTRAN) comprises the Long Term Evolution (LTE) and System Architecture Evolution (SAE).

Long Term Evolution (LTE) is a variant of a 3GPP radio access technology wherein the radio base station nodes are connected to a core network (via Access Gateways, or AGWs) rather than to radio network controller (RNC) nodes. In general, in LTE the functions of a radio network controller (RNC) node are distributed between the radio base stations nodes (eNodeB's in LTE) and AGWs. As such, the radio access network (RAN) of an LTE system has an essentially "flat" architecture comprising radio base station nodes without reporting to radio network controller (RNC) nodes.

"4G" refers to a fourth generation of cellular wireless standards which is a successor to the second generation (2G) and third generation (3G). IMT-Advanced or "4G" (including LTE-Advanced) systems aim to provide very high peak bit rates for mobile users: up to 1 Gb/s in static and pedestrian environments and up to 100 Mb/s in high speed mobile environments. In order to achieve the performance requirements of IMT-Advanced systems, a concept known as carrier aggregation (CA) has been proposed to aggregate two or more component carriers for supporting high data rate transmissions over a wide bandwidth (i.e. up to a 100 MHz for a single UE unit), while preserving backward compatibility with legacy systems. The carrier aggregation is also called (e.g., interchangeably called) "multi-carrier system", "multi-carrier operation", "multi-carrier" transmission and/or reception. Typically the component carriers in carrier aggregation belong to the same technology (e.g., either all are of WCDMA or LTE). However the carrier aggregation between carriers of different technologies is also possible to increase the throughput. Using carrier aggregation between carriers of different technologies is also referred to as "multi-RAT carrier aggregation" or "multi-RAT-multi-carrier system" or simply "inter-RAT carrier aggregation". For example, the carriers from WCDMA and LTE may be aggregated. Another example is the aggregation of LTE and CDMA2000 carriers. For the sake of clarity the carrier aggregation within the same technology may be regarded as 'intra-RAT' or simply 'single RAT' carrier aggregation.

There are two general cases or types of carrier aggregation. A first general case is continuous carrier aggregation; a second general case is non-continuous carrier aggregation. In continuous carrier aggregation the available component carriers are adjacent to each other, e.g., adjacent to one another in the same frequency band. In non-continuous carrier aggregation the aggregated component carriers are separated along the frequency band. In both cases, multiple component carriers are aggregated to serve a single user equipment unit (UE). According to existing spectrum allocation policies and the fact that the spectrum resource in the low frequency bands is scarce, it is difficult to allocate continuous 100 MHz bandwidth for a mobile network. Therefore, the non-continuous carrier aggregation technique provides a practical approach to enable mobile network operators to fully utilize their (often scattered) spectrum resources. In fact, the candidate frequency bands proposed at World Radio Conference 2007 (WRC '07) for IMT-Advanced are non-continuous and some of them are less than 100 MHz.

Non-continuous carrier aggregation are typically further categorized as (1) multiple (non-contiguous) component carriers that are separated such that they belong to different frequency bands, and (2) multiple (non-contiguous) component carriers that are within the same frequency band. Yet a third carrier aggregation category is also possible: a hybrid of contiguous and non-contiguous carriers. For example the hybrid CA may comprise of two or more adjacent carriers in one frequency band (e.g. band A) and one or more contiguous or non-contiguous carriers in another frequency band (e.g. band B).

Spectrum scarcity and high licensing costs have motivated the use of unlicensed spectrum bands, such as the industrial, scientific and medical (ISM) radio bands for communication purposes. See, e.g., ITU-R Definition of the ISM bands; http://www.itu.int/ITU-R/terrestrial/faq/index.html#g013. Indeed, the following are examples of short range "local" communication technologies utilizing unlicensed spectrum:

Bluetooth operating in the 2450 MHz band. See, e.g., http://www.bluetooth.com/English/Pages/default.aspx.

HIPERLAN, standardized for the 5800 MHz band. See, e.g., E. P. Vasilakopoulou, G. E. Karastergios and G. D. Papadopoulos, "Design and Implementation of the Hiperlan/2 Protocol", SIGMOBILE Mobile Computing and Communications Review, Vol. 7, No. 2, pp. 20-32, ACM, New York, USA, 2003.

the IEEE 802.11 family widely deployed in the 2450 MHz and 5800 MHz bands. See, e.g., http://standards.ieee.org/getieee802/802.11.html.

While these and some other frequency bands are free to use, certain rules and regulations concerning maximum output power, power density and so called spurious emissions must be followed. See, for example, ITU-R Regulations: http://www.itu.int/publ/R-REG-RR/e.

Although cellular systems typically operate in spectrum bands licensed to a specific cellular operator within a geographical region, operating cellular technologies in unlicensed bands have some attractive features. For example, the feasibility and main technical characteristics of operating 3GPP High Speed Packet Access (HSPA) systems in unlicensed spectrum traditionally used by IEEE 802.11 compatible wireless local area networks (WLAN) have been examined. See, e.g., Kristina Zetterberg, "High Speed Downlink Shared Channel in Unlicensed Frequency Bands", Master Thesis, Linköpings University, 2004. Operation in unlicensed spectrum has the advantages of increased bandwidth for user data, and reduced interference in the licensed band due to steering part of the data traffic to the unlicensed band. However, since many wireless communication (and other) devices may share the same unlicensed band, interference management is crucial for obtaining acceptable performance while complying with regulatory constraints. See, e.g., "WiFi and Bluetooth Coexistence Issues and Solutions", White Paper, Texas Instruments, http://focus.ti.com/pdfs/vf/bband/coexistence.pdf.

State of the art technologies such as Bluetooth readily support direct communication between different devices, such as mobile telephones, headsets, computer keyboards or even sensors. Recently, such direct device-to-device communications based on cellular technologies such as the 3GPP LTE system has been proposed as a means of short range (up to 100 m) communications between user equipments. The details of this technology component include the power control and interference mitigation as well as the synchronization and scheduling aspects. See, e.g., K. Doppler, M. Rinne, C. Wijting, C. B. Riberio and K. Hugl, "Device-to-device Communications as an Underlay to LTE-Advanced Networks", IEEE Communications Magazine, pp. 42-49, Vol. 47, No. 12, December 2009.

Although the current solutions provide PHY layer mechanisms to aggregate scattered component carriers, they are designed with underlying assumption that all component carriers lie in licensed spectrum bands. When some of the components are unlicensed carriers, not only the PHY layer carrier aggregation mechanisms need to be verified, but also the implications of using mixed aggregated licensed and unlicensed bands for a single user equipment unit (UE) on radio resource management need to be revisited.

For example, due to power allocation constraints for the unlicensed carriers, the coverage area of the component carriers are necessarily different, and such difference in coverage areas has direct implications on power control, handover, and cell reselection, as well as scheduling algorithms. For instance, as illustrated in FIG. 1, the scheduler needs to be aware of a user equipment unit (UE) being in the cell center or cell edge area. FIG. 1 shows that, due to the unequal maximum power allocation (limits) in the licensed and unlicensed spectrum bands, in the downlink from the base station the coverage area includes both a cell center and a cell edge area in a mixed licensed/unlicensed aggregation scenario. There may also be a difference in uplink coverage as well. For example, a Bluetooth or WLAN device may use a maximum of 100 mW transmit power, whereas an LTE user equipment unit may use up to 250 mW. A user equipment unit UEc in the cell center may be served by the unlicensed component carriers, but a user equipment unit UEe in the cell edge area may only be served by/scheduled on the licensed component carriers.

In a mixed (i.e. mixed licensed/unlicensed) carrier aggregation scenario, deployments may differ in terms of inter-site distance (ISD) and its impact on whether continuous operation in unlicensed component carriers for a given user equipment unit (UE) is possible or not. Due to an ISD "dimensioned" for the licensed component carriers, a user equipment unit (UE) making use of mixed unlicensed/licensed carrier aggregation needs to "switch off/on" unlicensed components as they move in the coverage area. For example, FIG. 2 illustrates that the UE capable of mixed unlicensed/licensed carrier aggregation when moving from the left cell to the right cell would first be eligible for unlicensed components in the cell center area of the left cell, but would then have to switch off the unlicensed components when entering the cell edge area of the left cell and would eventually be able to switch on the unlicensed components in the cell center area of the right cell.

SUMMARY

The technology disclosed herein attempts to provide, e.g., service continuity for high peak rate wide bandwidth user equipment units enjoying the benefits of (mixed) carrier aggregation.

In one of its aspect the technology disclosed herein concerns a method of operating a radio access network comprising a radio access network node and plural wireless devices. In an example embodiment and mode the method comprises at least a first wireless terminal (a "relayed" wireless terminal) using mixed carrier aggregation (the mixed carrier aggregation comprising licensed component carriers and unlicensed component carriers), and a relay node transmitting data over a wireless interface between the radio access network node and the first wireless terminal using an unlicensed component carrier allocated to the first wireless terminal.

The relaying provided by the relay node may occur either in a downlink (DL), and uplink (UL), or both downlink (DL) and uplink (UL). In terms of the downlink, a mode and embodiment of the method comprises the first wireless terminal (e.g., the "relayed" wireless terminal) receiving data from the relay node on the unlicensed component carrier allocated to the first wireless terminal; receiving data from the radio access network node on a licensed component carrier allocated to the first wireless terminal, and performing carrier aggregation of the unlicensed component carrier and the licensed component carrier allocated to and received by the first wireless terminal. In terms of the uplink (UL), a mode and embodiment of the method comprises the first wireless terminal transmitting data to the relay node on the unlicensed component carrier and the relay node in turn transmitting the unlicensed component carrier to the radio access network node; the first wireless terminal transmitting data to the radio access network node on a licensed component carrier; and the radio access network node performing carrier aggregation of the unlicensed component carrier and the licensed component carrier.

In some example embodiments and modes the relay node is a second wireless terminal, and is also known as the relay wireless terminal or the relay-serving wireless terminal. The second wireless terminal not only performs the relaying of the unlicensed component carrier allocated to the first wireless terminal, but may also perform transmission and/or reception activities as a user equipment unit (UE) for its user. For example, in terms of the downlink, in a mode and embodiment of the method comprises the relay node-serving second wireless terminal receiving data from the radio access network node on an unlicensed component carrier allocated to the second wireless terminal; receiving data from the radio access network node on a licensed component carrier allocated to the second wireless terminal; and, performing carrier aggregation of the unlicensed component carrier and the licensed component carrier allocated to and received by the second wireless terminal; all in addition to transmitting the data between the radio access network node and the first wireless terminal the unlicensed component carrier allocated to the first wireless terminal. In terms of the uplink, in a mode and embodiment of the method comprises the relay node-serving second wireless terminal transmitting data to radio access network node on the unlicensed component carrier allocated to the relay node-serving wireless terminal and transmitting data to the radio access network node on a licensed component carrier; with the radio access network node performing carrier aggregation of the unlicensed component carrier and the licensed component carrier received from the second wireless terminal.

In another of its aspects the technology concerns determining or selecting what nodes (e.g., what wireless terminals) are available or qualified to serve as relay nodes. In one example embodiment and mode the radio access network node sends a paging message to the plural wireless devices to locate a candidate wireless device to serve as the relay node. In another example embodiment and mode a prospective relay wireless device, e.g., the second wireless terminal, registers itself with the radio access network node as a candidate for the relay node.

In conjunction with relay node selection, in an example embodiment and mode the radio access network node may provide an incentive for a wireless device such as the second wireless terminal to serve as the relay node.

In another of its aspects the technology concerns terminating or otherwise limiting service by a relay node. In an example embodiment and mode, the relay node-serving second wireless terminal notifies the radio access network node when the second wireless terminal may no longer act as the relay node. For example, the second wireless terminal may notify the radio access network node when one of the following precludes the second wireless terminal from acting as the relay node: (1) a battery condition of the second wireless terminal; (2) a usage requirement or capability of the second wireless terminal; (3) a radio condition of a relay link between the second wireless terminal and the first wireless terminal. In yet other example embodiments and modes, the second wireless terminal may, instead of completing terminating its relay service, moderate its service as the relay node by performing relay activity according to at least one of a moderated time pattern; a moderated data rate; and moderated data block size.

In many situations the relay node may be a node (e.g., wireless terminal) which is served by the radio access network node (e.g., served by a base station which performs the role of the radio access network node). But in accordance with other embodiments and modes in other situations the radio access network node selects the second wireless terminal to be the relay node even though the second wireless terminal is served by another radio access network node (e.g., the second wireless terminal is served by another base station other than the base station which assigns the component carriers). In other words, the radio access network node may hand the first wireless terminal over to another radio access network node when the radio access network node cannot locate a candidate relay node served by the radio access network node, and when the other radio access network node may locate a relay node for relaying unlicensed component carriers to the first wireless terminal.

In another of its aspects the technology disclosed herein concerns a radio access network node suitable for accommodating unlicensed component carrier relaying. In an example embodiment the radio access network node comprises a communication interface and a relay manager. The relay manager is configured to authorize a relay node to transmit data between the radio access network node and the first wireless terminal using an unlicensed component carrier.

In an example embodiment the radio access network further comprises a scheduler configured to allocate the unlicensed component carrier to the first wireless terminal and to allocate a licensed component carrier to the first wireless terminal. As mentioned above, the relaying authorized and managed by the radio access network node may occur either in a downlink (DL), and uplink (UL), or both downlink (DL) and uplink (UL). Thus, in an example embodiment the scheduler is configured to allocate a downlink unlicensed component carrier to the first wireless terminal; to allocate an uplink unlicensed component carrier to the first wireless terminal; to allocate a downlink licensed component carrier to the first wireless terminal; and to allocate an uplink licensed component carrier to the first wireless terminal.

In an example embodiment the relay node may be a second wireless terminal. The scheduler of the radio access network node may also schedule licensed component carriers and unlicensed component carriers for the relay node-serving second wireless terminal. In this regard, in an example embodiment the scheduler is further configured to allocate a second wireless terminal unlicensed component carrier to the second wireless terminal and allocate a second wireless terminal licensed component carrier to the second wireless terminal.

As mentioned above, in another of its aspects the technology disclosed herein concerns determining or selecting what nodes (e.g., what wireless terminals) are available or qualified to serve as relay nodes. In one example embodiment the relay manager of the radio access network node is configured to send a paging message to plural wireless devices to locate a candidate wireless device to serve as the relay node. In another example embodiment the relay manager is configured to receive and process a registration message from a wireless device intending to register itself with the radio access network node as a candidate for the relay node. Moreover, in an example embodiment the relay manager is configured to provide an incentive for the wireless device to serve as the relay node.

In another of its aspects the technology disclosed herein concerns a relay node of the radio access network. In an example embodiment such relay node comprises a communication interface and a relay controller. The communication interface is configured to facilitate communication across a radio interface with the radio access network node and a first wireless terminal. At least the first wireless terminal is configured to use mixed carrier aggregation, the mixed carrier aggregation comprising licensed component carriers and unlicensed component carriers. The relay controller is configured to transmit (e.g., relay) data between the radio access network node and the first wireless terminal using an unlicensed component carrier allocated by the radio access network node to the first wireless terminal.

The relay node may be a relay node-serving wireless terminal, and as such does not confine its activity to relaying of unlicensed component carriers to other wireless terminals. For example, in an example embodiment the relay node-serving wireless terminal further comprises a scheduler configured to process data received on an unlicensed component carrier allocated to the relay wireless terminal; to process data received from the radio access network node on a licensed component carrier allocated to the relay wireless terminal; and to perform carrier aggregation of the unlicensed component carrier allocated to the relay wireless terminal and the licensed component carrier allocated to the relay wireless terminal.

In conjunction with the network seeking qualified and available relay nodes, in an example embodiment the relay controller of the relay node-serving wireless terminal is configured to process a paging message received from the radio access network node and, in response to the paging message, to negotiate service as the relay node. In another example embodiment the relay controller is configured to register with the radio access network node as a candidate for the relay node.

In an example embodiment the relay controller of the relay node is configured to notify the radio access network node when the relay wireless terminal may no longer act as the relay node. For example, in example embodiments the relay controller is configured to notify the radio access network node when one of the following precludes the relay wireless terminal from acting as the relay node: (1) a battery condition of the relay wireless terminal; (2) a usage requirement of the relay wireless terminal; (3) a condition of a relay link between the relay wireless terminal and the first wireless terminal.

In an example embodiment the relay controller of the relay node is configured to moderate service by the wireless terminal as the relay node by performing relay activity according to at least one of a moderated time pattern; a moderated data rate; and moderated data block size.

In another of its aspects the technology disclosed herein concerns a wireless terminal which serves as the relayed wireless terminal. In an example embodiment such relayed wireless terminal comprises a communication interface and a scheduler. The communication interface is configured to facilitate communication across a radio interface with a radio access network node and a relay wireless terminal. The wireless terminal and the relay wireless terminal are configured to use mixed carrier aggregation, the mixed carrier aggregation comprising licensed component carriers and unlicensed component carriers. The scheduler is configured (1) to receive or transmit data from or to the radio access network node on a licensed component carrier allocated by the radio access network node to the wireless terminal; (2) to receive or transmit data from or to the relay wireless terminal on an unlicensed component carrier allocated by the radio access network node to the first wireless terminal; and (3) to perform carrier aggregation of the unlicensed component carrier and the licensed component carrier received by the wireless terminal.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

Figure 1:
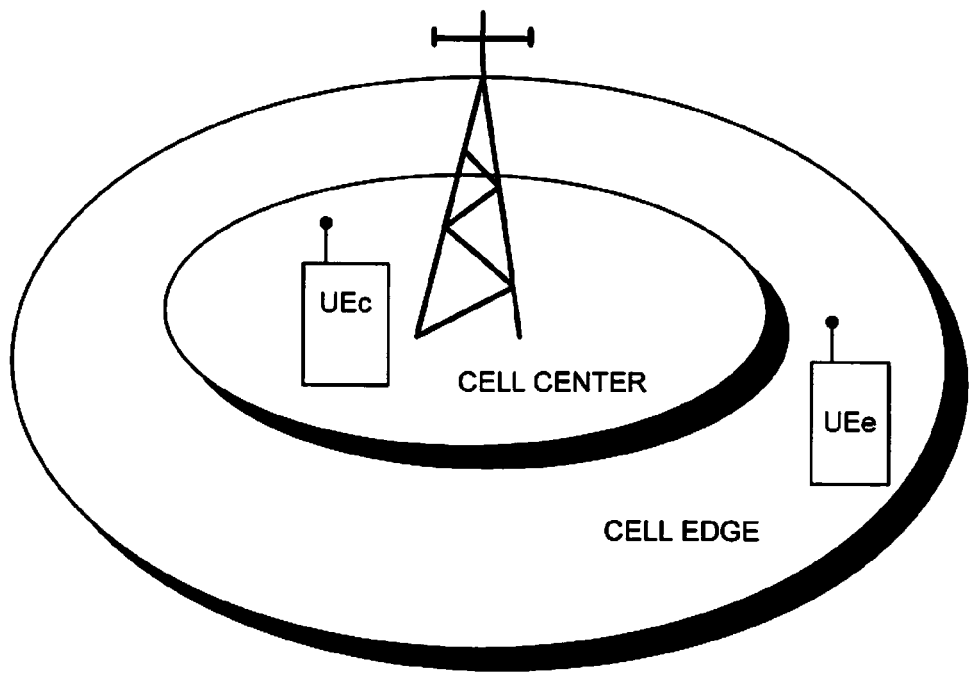
FIG. 1 is a diagrammatic view showing a portion of a radio access network for illustrating a carrier aggregation coverage area as comprising a center cell area and a cell edge area.
Figure 2:
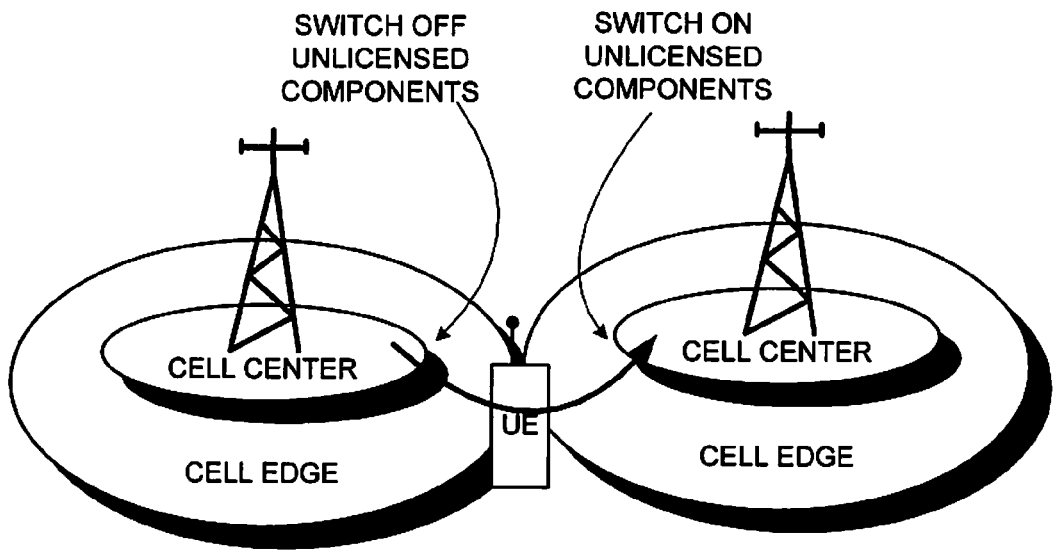
FIG. 2 is a diagrammatic view showing a portion of a radio access network comprising two cells and illustrating a situation potentially requiring switching on and off of unlicensed components in conjunction with movement of a wireless terminal.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It will be appreciated by those skilled in the art that block diagrams herein may represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "computer", "processor" or "controller" may be provided through the use of dedicated hardware as well as hardware capable of executing software in the form of coded instructions stored on computer readable medium. A computer is generally understood to comprise one or more processors, and the terms computer and processor may be employed interchangeably herein. When provided by a computer or processor, the functions may be provided by a single dedicated computer or processor, by a single shared computer or processor, or by a plurality of individual computers or processors, some of which may be shared or distributed. Such functions are to be understood as being computer-implemented and thus machine-implemented. Moreover, use of the term "processor" or "controller" shall also be construed to refer to other hardware capable of performing such functions and/or executing software, and may include, without limitation, digital signal processor (DSP) hardware, reduced instruction set processor, hardware (e.g., digital or analog) circuitry, and (where appropriate) state machines capable of performing such functions.

As used herein, a "relay node" may be any type of non-fixed relay device suitable for transmitting and/or receiving unlicensed component carriers for carrier aggregation. As such, a relay node can include or comprise a wireless terminal. As used herein, "wireless terminal" or "UE" may be a mobile station or a user equipment unit (UE) such as but not limited to mobile telephones ("cellular" telephones) and laptops with wireless capability, e.g., mobile termination, and thus may be, for example, portable, pocket, hand-held, computer-included, or car-mounted mobile devices which communicate voice and/or data with radio access network. A wireless terminal or UE may also be any type of wireless or mobile relay node, which typically serves other user equipment units. For example a mobile relay may be installed in a movable vehicle such as in a bus, train, or boat to serve the wireless terminals inside or in close proximity of the movable vehicle.

Figure 3:
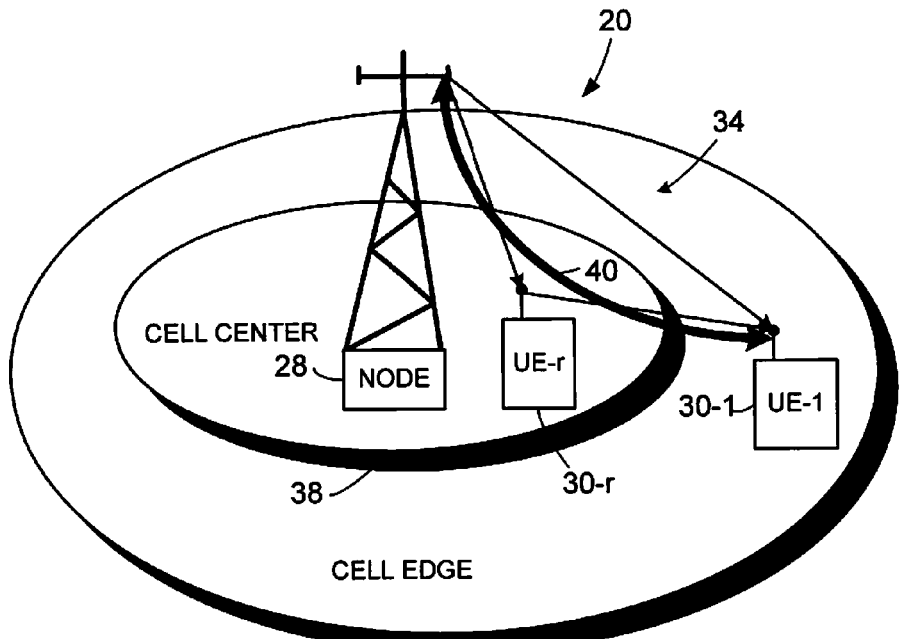
FIG. 3 is a diagrammatic view showing a portion of a radio access network and illustrating bi-directional unlicensed component carrier relaying.

FIG. 3 shows portions of a radio access network 20 comprising radio access network node 28 and plural wireless terminals 30-1 and 30-r. In an example embodiment radio access network node 28 may be a base station node (e.g., a radio base station node as in W-CDMA or an eNodeB or an eNB node as in Long Term Evolution (LTE)). The radio access network node 28 is configured and capable of operating with mixed carrier aggregation (e.g., both licensed component carriers and unlicensed component carriers) in its service of the plural wireless terminals 30-r and 30-1. In such example embodiment the base station or eNodeB 28 serves a cell 34. An existing outer edge of coverage for licensed component carriers is depicted by line 36. The cell 34 may also be conceptualized as including a cell central region whose current outer edge is depicted by line 38 in FIG. 3.

As understood with reference to preceding explanation, in view of, e.g., limitations or characteristics of the unlicensed component carriers, the radio access network node 28 may not be able to communicate using the unlicensed component carriers of the carrier aggregation with a wireless terminal (such as wireless terminal 30-1) which is beyond the cell central region, e.g. a wireless terminal near the cell edge 36. According to an aspect of the technology disclosed herein, a relay node 30-r (e.g., a wireless terminal device such as a second wireless terminal) is used to transmit data between the radio access network node 28 and the wireless terminal 30-1 using an unlicensed component carrier (illustrated by line 40 in FIG. 3) allocated to the (first) wireless terminal 30-1.

Thus, FIG. 3 illustrates utilization of mixed device-to-device (D2D) and infrastructure-based communications to facilitate mixed licensed and unlicensed carrier aggregation for a given wireless terminal. In this regard, FIG. 3 illustrates an example embodiment of relaying for mixed licensed and unlicensed carrier aggregation according to an aspect of the technology disclosed herein. In FIG. 3 wireless terminal 30-1 is capable of using wide bandwidth by means of mixed carrier aggregation, but situated as shown in FIG. 3 (e.g., in a cell edge area) wireless terminal 30-1 is out of the coverage of unlicensed component carriers. The relay node 30-r has similar carrier aggregation capabilities as wireless terminal 30-1 but, in contrast to wireless terminal 30-1, is located in the cell center and thus is within coverage of the unlicensed component carriers. Moreover, wireless terminal 30-r is also in proximity (e.g., within 50-100 m) of wireless terminal 30-1.

Figure 3A:
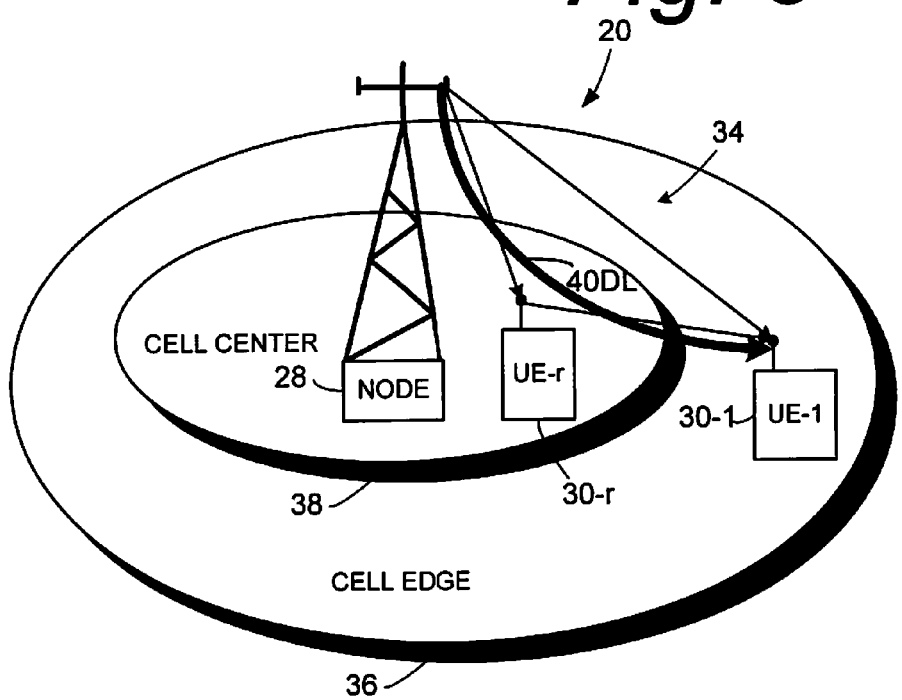
FIG. 3A is a diagrammatic view showing a portion of a radio access network and illustrating downlink (DL) unlicensed component carrier relaying.
Figure 3B:
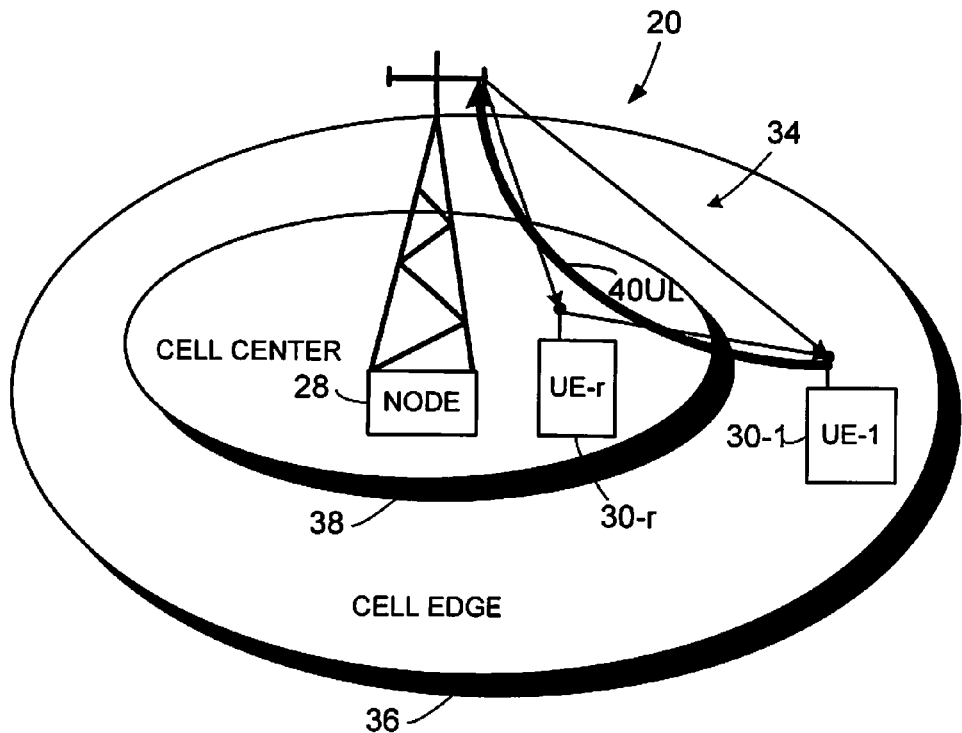
FIG. 3B is a diagrammatic view showing a portion of a radio access network and illustrating uplink (UL) unlicensed component carrier relaying.

As used herein, transmitting data using the unlicensed component carrier allocated to a wireless terminal "between" the radio access network node 28 and the wireless terminal may involve transmission of the data both on the uplink (UL) and the downlink (DL) [e.g., bi-directional relaying] as shown in FIG. 3, or only transmission of the data on the downlink from the radio access network node 28 to the wireless terminal 30-1 in the manner shown by unlicensed component carrier 40DL in FIG. 3A, or only transmission of the data on the uplink from the wireless terminal 30-1 to the radio access network node 28 in the manner shown by unlicensed component carrier 40UL in FIG. 3B.

As used herein, the terms "data" and "information" are not limited to user specific data or information (also called user plane) such as speech or Internet data. Rather the terms "data" and "information" also denote any type of additional information contents transmitted to and from the wireless terminals. The examples of additional information contents are signaling (control plane), network configuration or system information, etc. The user data and other information can either be carried on the same component carrier via multiplexing or they can be carried using different component carriers. Typically one of the component carriers e.g. licensed carrier may contain both user specific data and signaling whereas the unlicensed component carrier may carry only the user specific data.

For sake of simplicity, in terms of providing relaying of unlicensed component carriers to wireless terminal 30-1 it is generally described herein that the unlicensed component carriers which are used to transmit data between the radio access network node 28 and the relay node 30-$r$ are the same unlicensed component carriers (i.e., the same carrier frequencies) which are transmitted between the relay node 30-$r$ and the wireless terminal 30-1. That is, the resources which are used for transmission of the unlicensed component carriers between the radio access network node 28 and the relay node 30-$r$ are the same as the resources used for transmission of the unlicensed component carrier between the relay node 30-$r$ and the wireless terminal 30-1. This use of same resources is possible by using time division multiplexing (TDM) of the same unlicensed component carriers for transmission between the radio access network node to UE-r radio link (i.e. between the radio access network node 28 and the relay node 30-$r$) and the UE-r to UE-1 radio link (relay node 30-$r$ and the wireless terminal 30-1). The TDM approach requires less spectrum (as compared to using different frequency resources between radio access network node 28 and 30-$r$ and relay node 30-$r$ and wireless terminal 30-1) at the expense of lower throughput due to requiring more time for the data transmissions. The TDM approach may also involve more complexity since the transmission of the same unlicensed component carriers over the two radio links need coordination and signaling.

As employed herein, a relay node transmitting data on an unlicensed component carrier allocated to the first wireless terminal between the radio access network node and the first wireless terminal using an unlicensed component carrier allocated to the first wireless terminal also encompasses using more than one and unlicensed carrier components and indeed using different unlicensed component carriers for transmission over the radio access network node to UE-r and the UE-r to UE-1 radio links. In the approach of using different unlicensed component carriers, the data relayed between radio access network node 28 and wireless terminal 30-1 via relay node 30-$r$ may be carried on different unlicensed component carriers simultaneously between radio access network node 28 and relay node 30-$r$ than between relay node 30-$r$ and wireless terminal 30-1. Thus, using a relay node to transmit data on an unlicensed component carrier allocated to the first wireless terminal between the radio access network node and the first wireless terminal does not necessarily mean the same unlicensed component carrier is used along the path from radio access network node 28 to wireless terminal 30-1. This different unlicensed component carrier approach requires twice the spectrum, but as a result there is no loss in throughput compared to the TDM approach. In the case of spectrum scarcity the TDM approach is thus the more attractive.

In theory, as described in prior art, the data relayed by the relay node 28 between the radio access network node 28 and the wireless terminal 30-1 can also be carried over unlicensed component carrier(s) using analog network coding enabling simultaneous bidirectional or so called full duplex relaying. In essence, analog network coding (NC) manipulates data inside the network to improve throughput, delay, and/or robustness. In particular, network coding allows nodes to combine several input packets into one or several output packets. At intermediate nodes, some (linear) coding may be performed on the available packets, and the resulting encoded packet can be broadcasted to different recipients simultaneously instead of transmitting each packet separately. The area of analog network coding applied for bidirectional relaying is described by Sachin Katti, Ivana Maric, Andrea Goldsmith, Dina Katabi, Muriel Medard, "Joint Relaying and Network Coding in Wireless Networks", IEEE International Symp. Inf. Theory, Nice, France, 2007, which is incorporated herein by reference.

Figure 4:
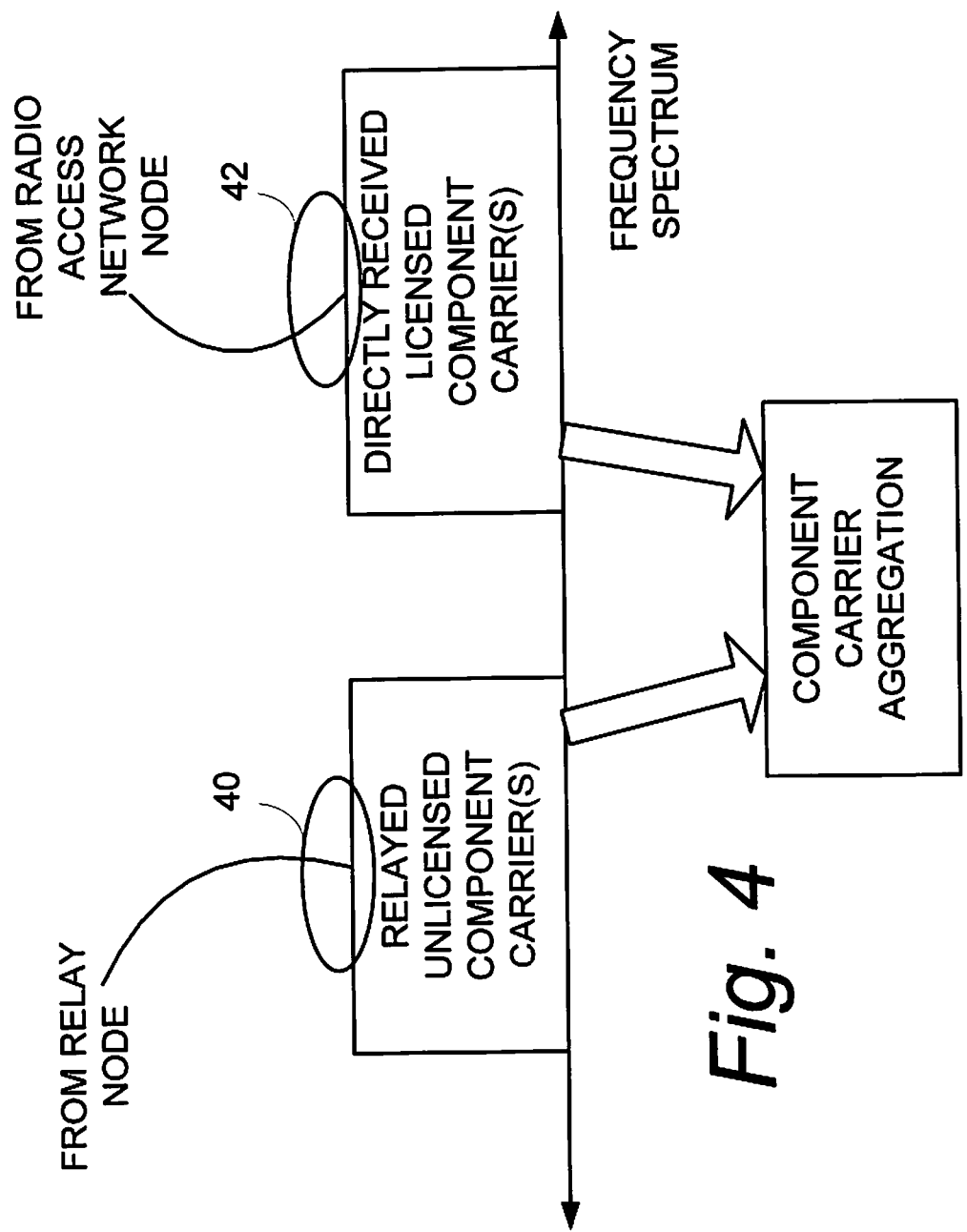
FIG. 4 is a diagrammatic view depicting carrier aggregation in a relaying context or scenario.

FIG. 4 illustrates in simplified form the concept of carrier aggregation in the context of a relaying scenario. Although illustrated with reference to wireless terminal 30-1, it will be understood that radio access network node 28 and relay node 30-$r$ and other wireless terminals employ essentially the same concepts. FIG. 4 depicts the wireless terminal 30-1 performing carrier aggregation, collectively using both information borne over unlicensed component carrier(s) 40 received from relay node 30-$r$ and information borne by licensed component carrier(s) 42 received from radio access network node 28. The person skilled in the art understands how the respective component carriers are prepared/processed.

Moreover, as used herein, "operating with mixed carrier aggregation" includes either or both of continuous mixed carrier aggregation and non-continuous carrier aggregation. As understood from the preceding discussion, non-continuous carrier aggregation may include (1) multiple (non-contiguous) component carriers that are separated such that they belong to different frequency bands, and (2) multiple (non-contiguous) component carriers that are within the same frequency band; and a hybrid of contiguous and non-contiguous carriers.

The licensed and unlicensed component carriers to be aggregated by the wireless 30-1 and 30-$r$ may belong to the same radio access technology (RAT) or to different RATs (multi-RAT or inter-RAT carrier aggregation scenario). For example all licensed and unlicensed component carriers may be of LTE. Alternatively the licensed and unlicensed component carriers may belong to WCDMA and LTE respectively or vice versa. Another example of a multi-RAT scenario comprises of LTE and WLAN component carriers on licensed and unlicensed spectrum respectively. Yet another example of LTE and WLAN carrier aggregation comprises of LTE operating in licensed component carriers, LTE operating in one set of unlicensed component carriers and the WLAN operating in the second set of unlicensed component carriers. The multi-RAT CA scenario may also comprise of licensed and unlicensed component carriers from more than two RATs e.g. comprising of WCDMA, LTE and WLAN whereby the licensed component carriers belong to LTE and WCDMA and the unlicensed component carriers may belong to WLAN.

Figure 5:
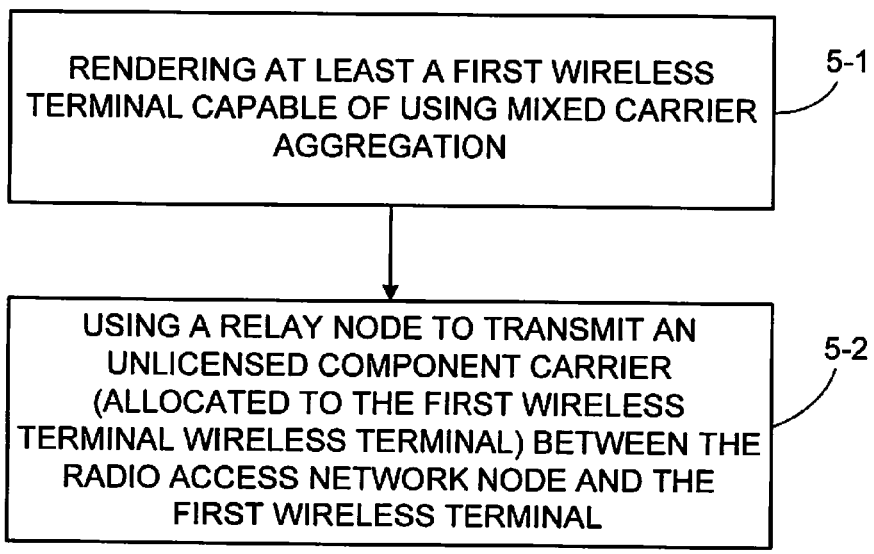
FIG. 5 is a flowchart showing basic, representative acts or steps comprising a method of operating a radio access network including relaying of an unlicensed component carrier.

FIG. 5 shows example acts or steps comprising a generic method of unlicensed component carrier relaying in accordance with an example embodiment and mode. Act 5-1 of FIG. 5 comprises rendering at least a first wireless terminal (e.g., wireless terminal 30-1) capable of using mixed carrier aggregation. Act 5-2 comprises using a relay node to relay an unlicensed component carrier (allocated to the first wireless terminal wireless terminal) between the radio access network node and the first wireless terminal. As explained below, in some embodiments the relay node may be a second wireless terminal, e.g., wireless terminal 30-$r$.

Figure 5A:
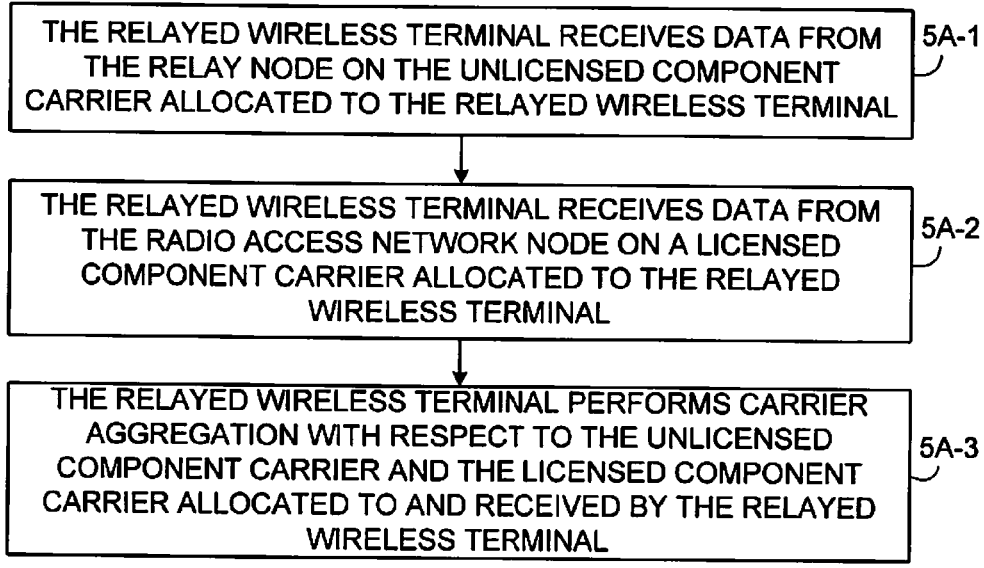
FIG. 5A is a flowchart illustrating example steps or acts of an example unlicensed component carrier downlink (DL) relaying method according to an example embodiment which affect or involve traffic to the relayed wireless terminal.

As mentioned above, the relaying provided by the relay node may occur either in a downlink (DL), and uplink (UL), or both downlink (DL) and uplink (UL). FIG. 5A illustrates example steps or acts of an example unlicensed component carrier downlink (DL) relaying method according to an example embodiment which affect the relayed wireless terminal, e.g., the first wireless terminal 30-1. Act 5A-1 comprises the first wireless terminal 30-1 receiving data from the relay node 30-$r$ on the unlicensed component carrier allocated to the first wireless terminal. Before act 5A-1 the relay node 30-r received the unlicensed component carrier allocated to the first wireless terminal from the radio access network node 28 and transmitted the unlicensed component carrier allocated to the first wireless terminal to the first wireless terminal 30-1. Act 5A-2 comprises the wireless terminal 30-1 receiving data from the radio access network node 28 on a licensed component carrier allocated to the first wireless terminal. Act 5A-3 comprises wireless terminal 30-1 performing carrier aggregation of the unlicensed component carrier and the licensed component carrier allocated to and received by the first wireless terminal.

Figure 5B:
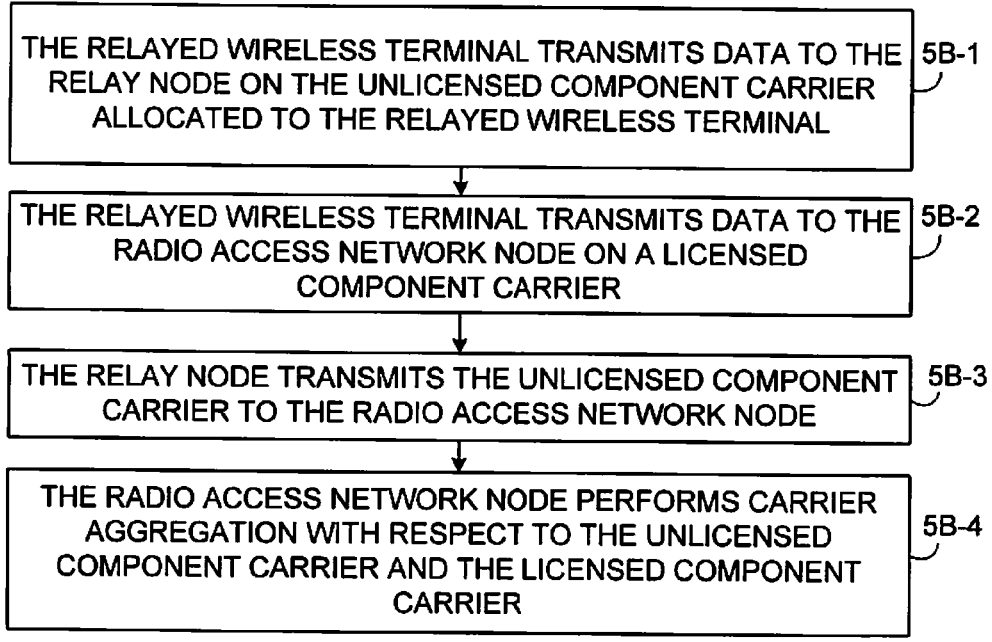
FIG. 5B is a flowchart illustrating example steps or acts of an example unlicensed component carrier uplink (UL) relaying method according to an example embodiment which affect or involve traffic from the relayed wireless terminal.

FIG. 5B illustrates example steps or acts of an example unlicensed component carrier uplink (UL) relaying method according to an example embodiment which affect the relayed wireless terminal, e.g., the first wireless terminal 30-1. Act 5B-1 comprises the first wireless terminal 30-1 transmitting data to the relay node 30-r on the unlicensed component carrier allocated to the wireless terminal 30-1. Act 5B-2 comprises wireless terminal 30-1 transmitting data to the radio access network node 28 on a licensed component carrier. Act 5B-3 comprises the relay node 30-r transmitting the unlicensed component carrier to the radio access network node 28. Act 5B-4 comprises the radio access network node 28 performing carrier aggregation of the unlicensed component carrier and the licensed component carrier. Act 5B-3 may follow either act 5B-1 or act 5B-2, or be essentially simultaneous with act 5B-2.

As mentioned above, the relay node 30-r can be any type of non-fixed wireless node. In some example embodiments and modes the relay node 30-r is a second wireless terminal. In view of the fact that the relay node 30-r may itself be a wireless terminal, the terminology "relayed" wireless terminal is sometimes used herein to refer to the first wireless terminal 30-1 and the terminology "relay" or relay node-serving" wireless terminal is sometimes used herein to refer to the wireless terminal 30-r. The second wireless terminal (e.g., the relay node-serving wireless terminal) not only performs the relaying of the unlicensed component carrier allocated to the first wireless terminal 30-1, but may also perform transmission and/or reception activities as a user equipment unit (UE) for its user. For its own traffic the reception activities of wireless terminal 30-r are on a downlink (DL) from radio access network node 28; the transmission activities of wireless terminal 30-r are on an uplink (UL) to radio access network node 28.

Figure 5C:
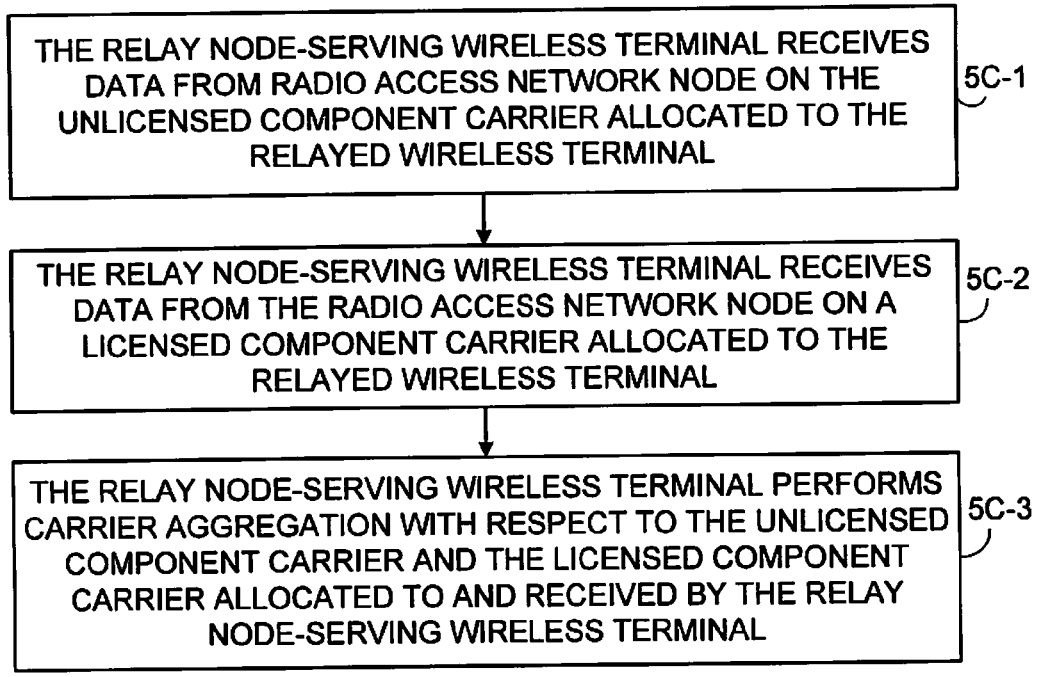
FIG. 5C is a flowchart illustrating example steps or acts of an example unlicensed component carrier downlink (DL) relaying method according to an example embodiment which affect or involve traffic to a relay node-serving wireless terminal.

FIG. 5C illustrates example steps or acts of an example unlicensed component carrier downlink (DL) relaying method according to an example embodiment which involve traffic for relay-node serving wireless terminal 30-r. Act 5C-1 comprises the wireless terminal 30-r receiving data from radio access network node 28 on the unlicensed component carrier allocated to the first wireless terminal. Act 5C-2 comprises the wireless terminal 30-r receiving data from the radio access network node 28 on a licensed component carrier allocated to the first wireless terminal. Act 5C-3 comprises wireless terminal 30-r performing carrier aggregation of the unlicensed component carrier and the licensed component carrier allocated to and received by the relay node-serving wireless terminal.

Figure 5D:
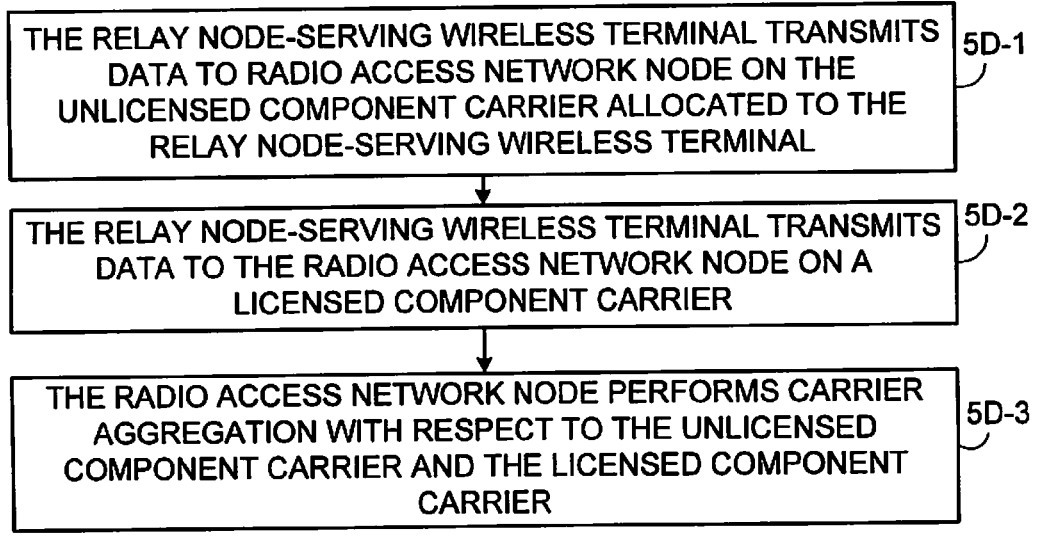
FIG. 5D is a flowchart illustrating example steps or acts of an example unlicensed component carrier uplink (UL) relaying method according to an example embodiment which affect or involve traffic from a relay node-serving wireless terminal.

FIG. 5D illustrates example steps or acts of an example unlicensed component carrier uplink (UL) relaying method according to an example embodiment which affect the relay node-serving wireless terminal 30-r. Act 5D-1 comprises the relay node-serving wireless terminal 30-r transmitting data to radio access network node 28 on the unlicensed component carrier allocated to the relay node-serving wireless terminal 30-r. Act 5D-2 comprises the relay node-serving wireless terminal 30-1 transmitting data to the radio access network node 28 on a licensed component carrier. Act 5D-3 the radio access network node 28 performing carrier aggregation of the unlicensed component carrier and the licensed component carrier received at acts 5D-1 and 5D-2, respectively.

Thus, in example embodiments and modes such as those described above a relay node such as wireless terminal 30-r acts as a relay for the unlicensed component carriers. The wireless terminal 30-r and wireless terminal 30-1 use the unlicensed spectrum for a direct device-to-device D2D communication link between each other. Wireless terminal 30-1 thus receives (1) licensed carrier aggregation components transmitted by the radio access network node 28 and (2) unlicensed carrier aggregation components transmitted via the relay node 30-r.

It will be appreciated that the carrier aggregation enables reception as well as transmission of more than one component carrier. The carrier aggregation in both uplink and downlink is primarily controlled and managed by the radio network node, which may be (for example) a radio base station node or an eNodeB (eNB node). As mentioned above, the radio network node 28 may use the carrier aggregation either in the uplink or in the downlink or in both directions. If uplink carrier aggregation is used then typically the downlink carrier aggregation is also required since in most scenarios the downlink bit rate is higher than in the uplink. Hence the wireless terminal 30-1 also transmits (1) licensed carrier aggregation components directly to the radio access network node 28 and (2) unlicensed carrier aggregation components to the relay node 30-r, which in turn relays the received unlicensed carrier aggregation components to the radio access network node 28. The radio access network node 28 thus receives (1) licensed carrier aggregation components directly from wireless terminal 30-1 and (2) unlicensed carrier aggregation components of wireless terminal 30-1 via relay node 30-r.

Figure 6:
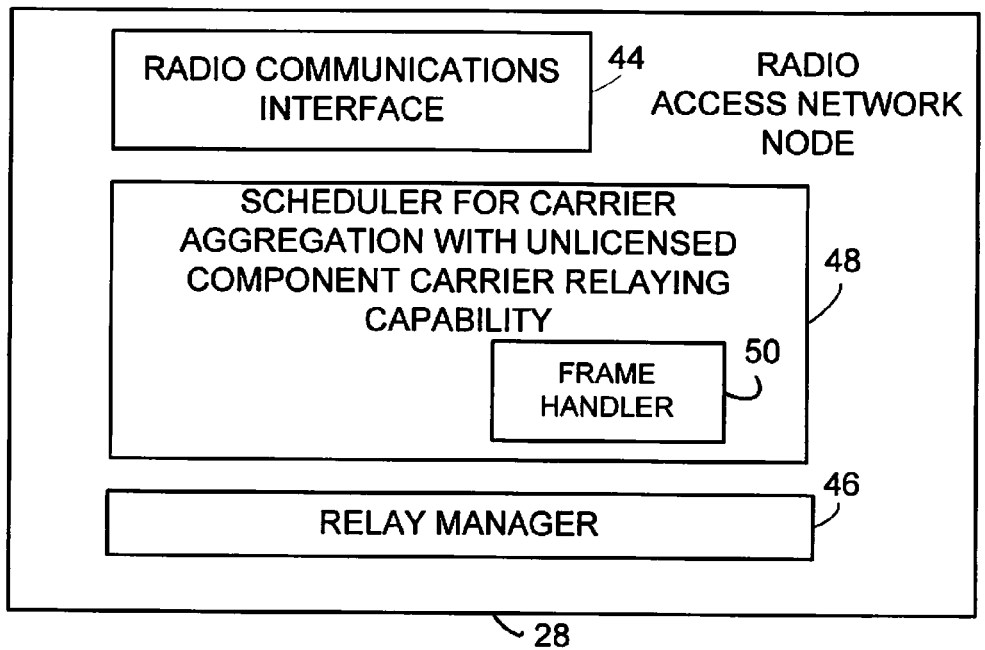
FIG. 6 is a schematic view of a generic radio access network node according to an example embodiment.

FIG. 6 illustrates a generic radio access network node 28 according to an example embodiment. The radio access network node 28 is configured and suited for providing carrier aggregation and in particular the unlicensed component carrier relaying of the technology disclosed herein. In this regard the example generic radio access network node 28 comprises radio communication interface 44 and relay manager 46. The communication interface 40 is configured to facilitate communication across a radio interface with the plural wireless terminals, e.g., wireless terminal 30-1 and relay node 30-r. Since the radio access network node 28 participates in transmitting and receiving both licensed component carriers and unlicensed component carriers, the radio communication interface 44 comprises (e.g., separate) antenna unit(s) and associated support equipment for both the licensed component carriers and the unlicensed component carriers.

The relay manager 46 is configured to authorize relay node 30-r to transmit an unlicensed component carrier between the radio access network node 28 and the first wireless terminal 30-1. Thus, relay manager 46 serves as means for enabling the second wireless terminals to act as a relay node 30-r and thereby transmit an unlicensed component carrier between the radio access network node and the first wireless terminal 30-1.

In an example embodiment the radio access network further comprises scheduler 48. The scheduler 48, also known as allocation means, is configured to allocate the unlicensed component carrier to the first wireless terminal 30-1 and to allocate a licensed component carrier to the first wireless terminal 30-1, and to format and/or prepare frames or other units of information suitable for conveying either signaling or user traffic data in both types of component carriers so scheduled, and both in the uplink (UL) and the downlink (DL) over the radio interface to the plural wireless terminals served by radio access network node 28. To this end, in FIG. 6 the scheduler 48 is shown generically as comprising a frame handler 50.

In some example embodiments, the same frame structure established by the scheduler 48 can be the same for both licensed component carriers and unlicensed component carriers. For example, in intra-radio access technology (RAT) or single radio access technology (RAT) carrier aggregation the licensed and unlicensed component carriers are viewed as two different sets of frequencies belonging to different parts of the spectrum but operating using the same technology (i.e. either both on WCDMA or LTE etc). The licensed band has typically more stringent radio requirements than the latter. In order for the wireless terminal to operate on a frequency band (i.e. reception and transmission) the wireless terminal needs the corresponding specific hardware—typically radio frequency (RF) filters or more generally RF circuitry. As an example, for licensed band A and unlicensed band B, the wireless terminal needs the RF circuitry corresponding to these bands. Thus, the case of single radio access technology (RAT) carrier aggregation is an example of the frame structure being the same for operating on the licensed and unlicensed bands.

However, in other embodiments, such as the case of multi-radio access technology (RAT) carrier aggregation, for example, the frame structures can be different for licensed and unlicensed bands. Furthermore the RF circuitry is also specific to the technology and the frequency band. A typical case of differing frame structures is that in which the licensed and the unlicensed component carriers operate using LTE and wireless local area network (WLAN), respectively. The latter technology typically operates in unlicensed part of spectrum. In embodiments such as multi-radio access technology (RAT) in which different frame structures may be utilized, the generic frame handler 50 of scheduler 48 may actually comprise plural frame handlers.

Figure 6A:
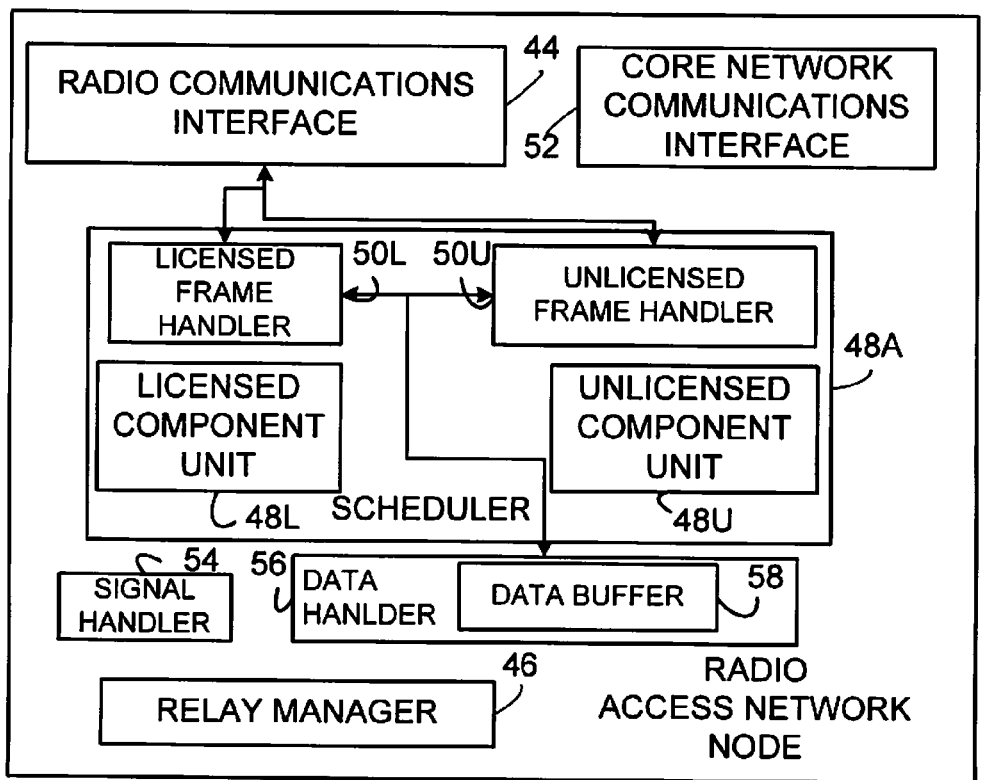
FIG. 6A-FIG. 6C are schematic views of other example embodiments and implementations of radio access network nodes.

FIG. 6A illustrates an example implementation of a radio access network node showing an example embodiment of scheduler 48 and other various components according to an example embodiment. The scheduler 48 of FIG. 6A illustrates the provision of plural frame handlers as mentioned above, such as a licensed component carrier frame handler 50L and an unlicensed component carrier frame handler 50U. The licensed component carrier frame handler 50L keeps track of the resources utilized by or comprising the licensed component carriers and prepares or processes information units, e.g., in frames or other formats, which are carried over the licensed component carriers between the radio access network node 28 and the wireless terminals served by radio access network node 28. On the other hand, unlicensed component carrier frame handler 50U keeps track of the resources utilized by or comprising the unlicensed component carriers and prepares or processes information units, e.g., in frames or other formats, which are carried over the licensed component carriers between radio access network node 28 and the wireless terminals served by radio access network node 28. Thus, both frame handlers 50L and 50U prepare information for transmission over their respective component carrier types on the downlink (DL) to the wireless terminals, and process information received by the radio access network node 28 over their respective component carrier types on the uplink (UL) from the wireless terminals.

FIG. 6A also shows other selected units comprising an example embodiment of radio access network node 28A, including communications interface 52; data handler 54; signal handler 56; and data buffer 58. In the situation in which the radio access network node 28 is a radio base station node or eNodeB, the communications interface 52 may take the form of a core network communications interface 52 over/to which packets such as protocol data units are received/forwarded. After processing (e.g., segmentation or the like) the packets received over interface 52 may be stored by data handler 54 in data buffer 58, and when in data buffer 58 the packets may be prepared by data handler 54 for use in a frame(s) prepared by either or both of frame handler 50U and frame handler 50L. Conversely, information received through carrier aggregation over the radio interface from a wireless terminal (such as wireless terminal 30-1) may be de-framed by the appropriate frame handler (one or both of frame handler 50L and 50U) and stored in data buffer 58 for eventual transmission, e.g., over core network communications interface 52, in accordance with whatever application is being executed or service performed.

Figure 7:
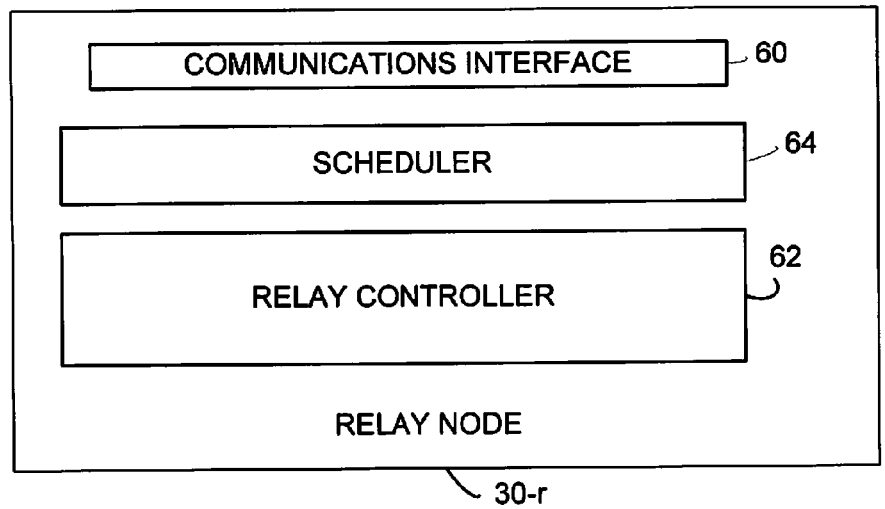
FIG. 7 is a schematic view of a generic relay node according to an example embodiment.

FIG. 7 illustrates a generic relay node 30-r according to an example embodiment. As indicated above, the relay node may be a network node which essentially serves network functions but has no direct user/customer running an application or engaging in a service provided through the relay node. Alternatively and as primarily illustrated herein, the relay node 30-r may be a relay node-serving wireless terminal, and as such does not confine its activity to relaying of unlicensed component carriers to other wireless terminals but may also serve as a user equipment unit (UE) for its own user.

The generic relay node 30-r of FIG. 7 comprises communication interface 60; relay controller 62; and scheduler 64. The communication interface 60 facilitates communication across a radio interface with radio access network node 28 and with first wireless terminal 30-1. The communication interface 60 comprises appropriate antenna unit(s) and associated equipment for transmission and reception of both the unlicensed component carriers and the licensed component carriers.

The relay controller 62 is configured to control relaying activities performed or sought to be performed by relay node 30-r, e.g., the relaying of an unlicensed component carrier (allocated by the radio access network node to the first wireless terminal) between radio access network node 28 and the first wireless terminal 30-1. In so doing the relay controller 62 works in conjunction with scheduler 64.

In terms of downlink (DL) activities, scheduler 64 is configured, e.g., to process data received on unlicensed component carrier(s) and on licensed component carrier(s). The data received on the licensed component carrier(s) is likely intended for the user of the relay node-serving wireless terminal 30-r. If the relay node 30-r is indeed serving as a wireless terminal for a user and receives such data on licensed component carrier(s) that are aggregated, then at least some of the data received on the unlicensed component carrier(s) will be for the relay node 30-r as well. If the relay node 30-r is at that time also serving as a relay node for wireless terminal 30-1, the other data, e.g., other unlicensed component carrier(s) are intended for the wireless terminal 30-1. In the case that the relay node 30-r is serving as a relay node, in an uplink (UL) activity scheduler 64 is configured to cause the unlicensed component carrier(s) intended for wireless terminal 30-1 to be transmitted by 60 to wireless terminal 30-1.

In terms of uplink (UL) activities, scheduler 64 is configured, e.g., to prepare data for transmission on unlicensed component carrier(s) and on licensed component carrier(s). The data prepared by relay node 30-r in conjunction with services or applications run by relay node 30-r on behalf of its user which is to be borne on the licensed component carrier(s) is likely intended for radio access network node 28. If the relay node 30-r is indeed serving as a wireless terminal for a user and is preparing such data in the context of carrier aggregation for licensed component carrier(s), then at least some of the data prepared by scheduler 64 is for transmission to radio access network node 28 on the unlicensed component carrier(s). If the relay node 30-r is at that time also serving as a relay node for wireless terminal 30-1, data received on the downlink (DL) from the wireless terminal 30-1 over unlicensed component carrier(s) will be prepared by scheduler 64 for transmission to radio access network node 28 on the uplink (UL) over the unlicensed component carriers allocated to the wireless terminal 30-1.

As indicated above, the relay node 30-r may be a relay node-serving wireless terminal providing active service to its own immediate user. In such case, in terms of downlink (DL) activities, scheduler 64 is configured, e.g., to process data received on an unlicensed component carrier allocated to the relay wireless terminal; to process data received from the radio access network node on a licensed component carrier allocated to the relay wireless terminal; and to perform carrier aggregation of the unlicensed component carrier allocated to the relay wireless terminal and the licensed component carrier allocated to the relay wireless terminal. In terms of uplink (UL) activities, in conjunction with carrier aggregation and for its own immediate user scheduler 64 is configured, e.g., to prepare data for transmission to radio access network node 28 both over unlicensed component carrier(s) allocated to the relay wireless terminal 30-r and over licensed component carrier(s) allocated to the relay wireless terminal 30-r.

Figure 8:
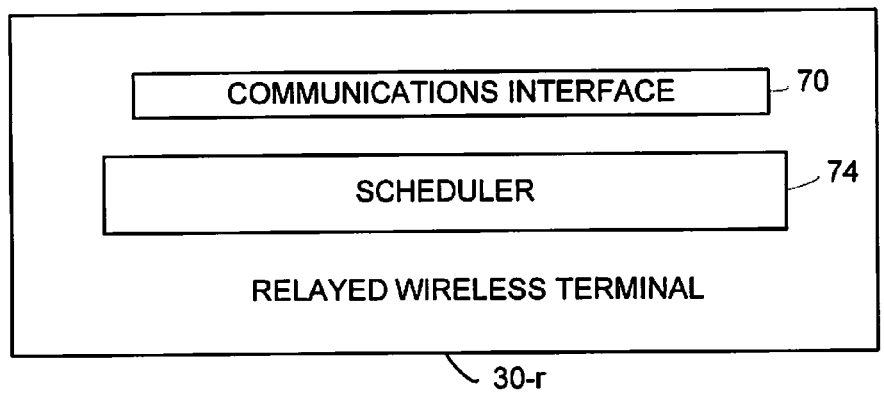
FIG. 8 is a schematic view a generic relayed wireless terminal according to an example embodiment.

FIG. 8 illustrates a generic wireless terminal 30-1 according to an example embodiment. As indicated previously, wireless terminal 30-1 is a "relayed" wireless terminal since it receives at least some unlicensed component carriers from the relay node 30-r. The relayed wireless terminal 30-1 of FIG. 8 comprises communication interface 70 and scheduler 74. The communication interface 70 facilitates communication across a radio interface with radio access network node 28 and with relay node 30-r. The communication interface 70 comprises appropriate antenna unit(s) and associated equipment for transmission and reception of both the unlicensed component carriers and the licensed component carriers. The scheduler 74 is configured (1) to receive or transmit data from or to radio access network node 28 on a licensed component carrier allocated by the radio access network node to the wireless terminal; (2) to receive or transmit data from or to the relay node 30-r on an unlicensed component carrier allocated by the radio access network node to the first wireless terminal; and (3) to perform carrier aggregation of the unlicensed component carrier and the licensed component carrier received by wireless terminal 30-1.

The radio access network node 28 uses prior art methods to keep track of the whereabouts of served wireless terminals in order to classify the wireless terminals that are in the cell center 38, boarder zone, or cell edge area (see FIG. 3). When the radio access network node 28 realizes that a particular wireless terminal such as wireless terminal 30-1 is moving out of the inner coverage area 38, and also realizes that wireless terminal 30-1 needs to maintain aggregated carriers (high throughput), the radio access network node 28 searches for an appropriate wireless terminal to serve as the relay node 30-r.

Thus, in another of its aspects the technology disclosed herein concerns determining or selecting what nodes (e.g., what wireless terminals) are available or qualified to serve as relay nodes. In accordance with this aspect of the technology, in an example embodiment illustrated in FIG. 6B the relay manager 46 of the radio access network node 28B comprises elements and functionalities represented by wireless terminal tracker 76; relay coordinator 78; and relay link authorizer 80. The wireless terminal tracker 76 keeps track of position and utilization of wireless terminals served by radio access network node 28. The relay coordinator 78 bears responsibility for determining which of the wireless terminals served by radio access network node 28 are eligible or candidates to serve as a relay node for wireless terminal 30-1. The relay coordinator 78 maintains relay node database 82 for keeping track of potential relay node candidates as well as wireless terminals which are already serving as relay nodes.

In order to be an "appropriate" and thus a candidate to serve as a relay node, a wireless terminal preferably fulfills the following conditions: (1) the candidate wireless terminal is in the proximity of the relay-needing wireless terminal 30-1; (2) the candidate wireless terminal is able (and willing to) to establish a device-to-device (D2D) link with the relay-needing wireless terminal 30-1 using the component carriers that would be used by the radio access network node 28 for mixed carrier aggregation.

In the above regard, it is not necessary that the relay node 30-r receive (for its own use) non-relayed data from the radio access network node 28 on unlicensed component carrier in order for the relay node 30-r to candidate or serve as the relay node. Rather, the relay node must be capable and willing, at least temporarily, to relay information on unlicensed component carriers to wireless terminal 30-1 in order for wireless terminal 30-1 to simultaneously use both licensed and unlicensed component carriers in a carrier aggregation operation.

The technology disclosed herein provides several non-limiting modes and embodiments for determining or selecting what nodes (e.g., what wireless terminals) are available or qualified to serve as relay nodes. In one such relay node candidate selection mode and embodiment illustrated in FIG. 9, as act 9-1 radio access network node 28 sends a paging message to the plural wireless devices 30 to locate a candidate wireless device to serve as the relay node. For example, the radio access network node 28 may use a modified paging message in order to search for qualified and willing candidate relay nodes. The modified paging message 9-1 is based on, or formatted in accordance with, information provided by a relay pager 84 (see FIG. 6B) which comprises the relay coordinator 78 of relay manager 46.

Figure 9:
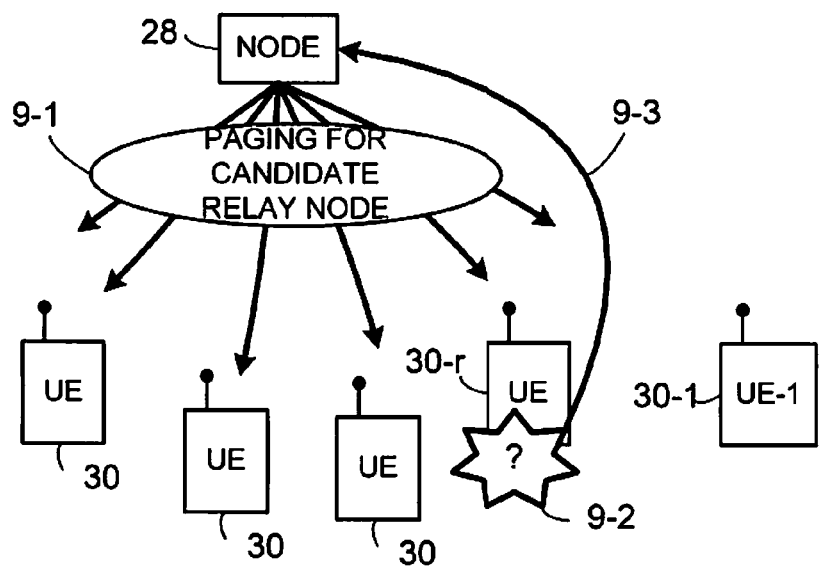
FIG. 9 is a diagrammatic view depicting an example paging mode for determining or selecting what nodes are available or qualified to serve as relay nodes.

In a modified paging message such as that illustrated as message 9-1 in FIG. 9, information about the position of the relay-needing wireless terminal 30-1, as well as carrier aggregation capabilities are broadcasted so as to allow receiving wireless terminals 30 to decide whether or not they are willing to act as a relay node for this particular relay-needing wireless terminal 30-1. The candidate wireless terminals, such as candidate relay node 30-r of FIG. 9, receive the relay node-seeking paging message 9-1 and, as act 9-2, enter into a decision whether or not to respond with an affirmative indication of willingness/ability to serve as the relay node.

In terms of making the decision of act 9-2 regarding potential relay node status, as an example embodiment FIG. 6A further shows the relay controller 62 of wireless terminal 30-r as comprising relay negotiator 86. By way of example, relay negotiator 86 comprises memory and/or logic for decision criteria 88 and parameter recommendations 90.

Information broadcasted and included in the paging message 9-1 may comprise many fields or information elements which may be stored in or used as decision criteria 88. Some example information elements which may be included in paging message 9-1 comprise path loss between the wireless terminal 30-1 and the radio access network node 28. Yet another set of information may comprise an expected time period (T0) over which the 30-1 is required to be supported. Other information that may be included in the paging message 9-1 may comprise the expected data rate/number of component carriers required/type of service etc. The positioning and/or path loss information or other relevant information (e.g. time period T0) may be used by interested wireless terminals in conjunction with decision 9-2 to decide whether they may assist wireless terminal 30-1 in acting as the relay node for the carrier aggregation or not. For example the time period T0, data rate, number of carriers, etc., may be used by the candidate relay node for evaluating the impact on its battery consumption when acting as relay. This is because the battery consumption is of particular importance for the mobile relay. In response the interested wireless terminals indicate to radio access network node 28 (or any other network node) their willingness to serve wireless terminal 30-1.

The candidate relay node may also provide its recommended parameters, which will ensure efficient battery consumption. For example the UE-r may indicate the maximum time period (T1) over which it may serve UE-1. Any such recommended parameters may be stored or maintained as the aforementioned parameter recommendations memory 90.

The result of decision 9-2 is communicated from the candidate relay node back to radio access network node 28 as act 9-3. The decision may be carried by any appropriate signal or message, and may include a bid to serve as the relay node along with the recommended parameters obtained or deduced by parameter recommendations 90 in conjunction with any negotiation performed by relay negotiator 86. If the relay coordinator 78 of radio access network node 28 accepts the bid or is agreeable with an affirmative decision from the candidate wireless terminal, the relay link authorizer 80 of the radio access network node 28 (see FIG. 6B) sets up (e.g., allocates and communicates) use of the appropriate unlicensed component carrier(s) which will be relayed through the accepting wireless terminal to the wireless terminal 30-1.

Figure 10:
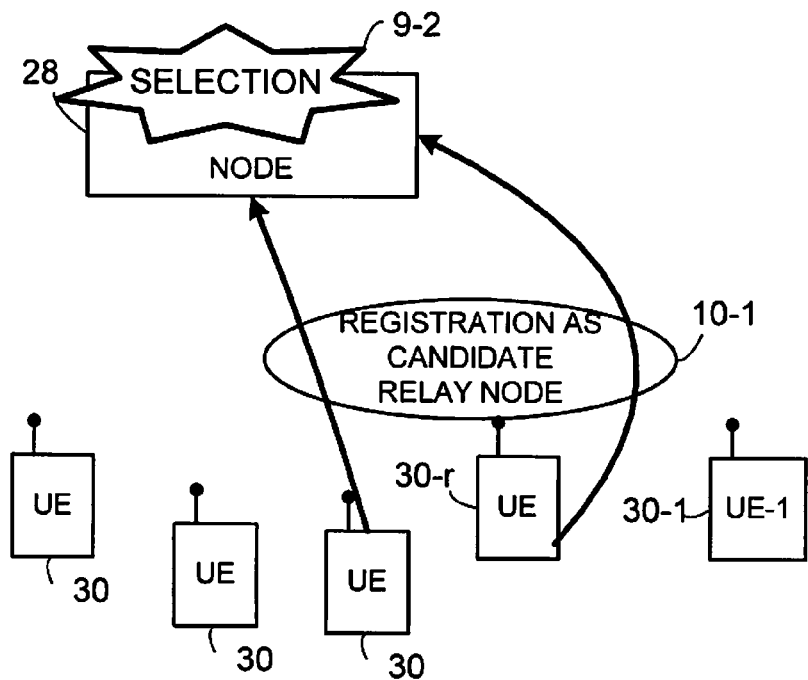
FIG. 10 is a diagrammatic view depicting an example registration mode for determining or selecting what nodes are available or qualified to serve as relay nodes.

FIG. 10 illustrates another example embodiment and mode for determining or selecting what nodes (e.g., what wireless terminals) are available or qualified to serve as relay nodes. In the example mode of FIG. 10, a wireless terminal such as the second wireless terminal 30-r registers itself with radio access network node 28 as a candidate for the relay node. In this regard, in the example radio access network node 28 of FIG. 6B the relay controller 62 comprises relay registration agent 94. The relay registration agent 94 comprises parameter reporter 96 and parameter recommender 98. The relay registration agent 94 prepares a registration message such as that depicted by act 10-1 of FIG. 10. Through the registration message the wireless terminals (such as wireless terminal 30-r in FIG. 10) which are interested in supporting carrier aggregation operation for other wireless terminals (e.g., acting as relays for other wireless terminals operation in carrier aggregation) indicate their preferences to the radio access network node 28 or register with radio access network node 28 (or any other network node, e.g. the core network or a node-containing data base).

The registering wireless terminals may also report additional information (e.g., path loss, location information etc.). This additional information which is optionally included in the registration message may be maintained in parameter reporter 96. Further, through the relay registration agent 94 the registering wireless terminal may also indicate to radio access network node 28 that the registering wireless terminal cannot serve the relay-needing wireless terminal under certain circumstances. For example, the registering wireless terminal may indicate that it will not be able to serve as a relay node when its battery power falls below certain level, e.g., up to 50% of battery power, for example. Similarly the maximum time period over which the candidate relay node may serve the relay-needing wireless terminal may also be signaled to radio access network node 28 in conjunction with or subsequent to the registration. The radio access network node 28 or other relevant network node may then (as act 10-2 in FIG. 10) select the most appropriate candidate relay node to serve the wireless terminal 30-1 from the set of registered wireless terminals.

Figure 6B:
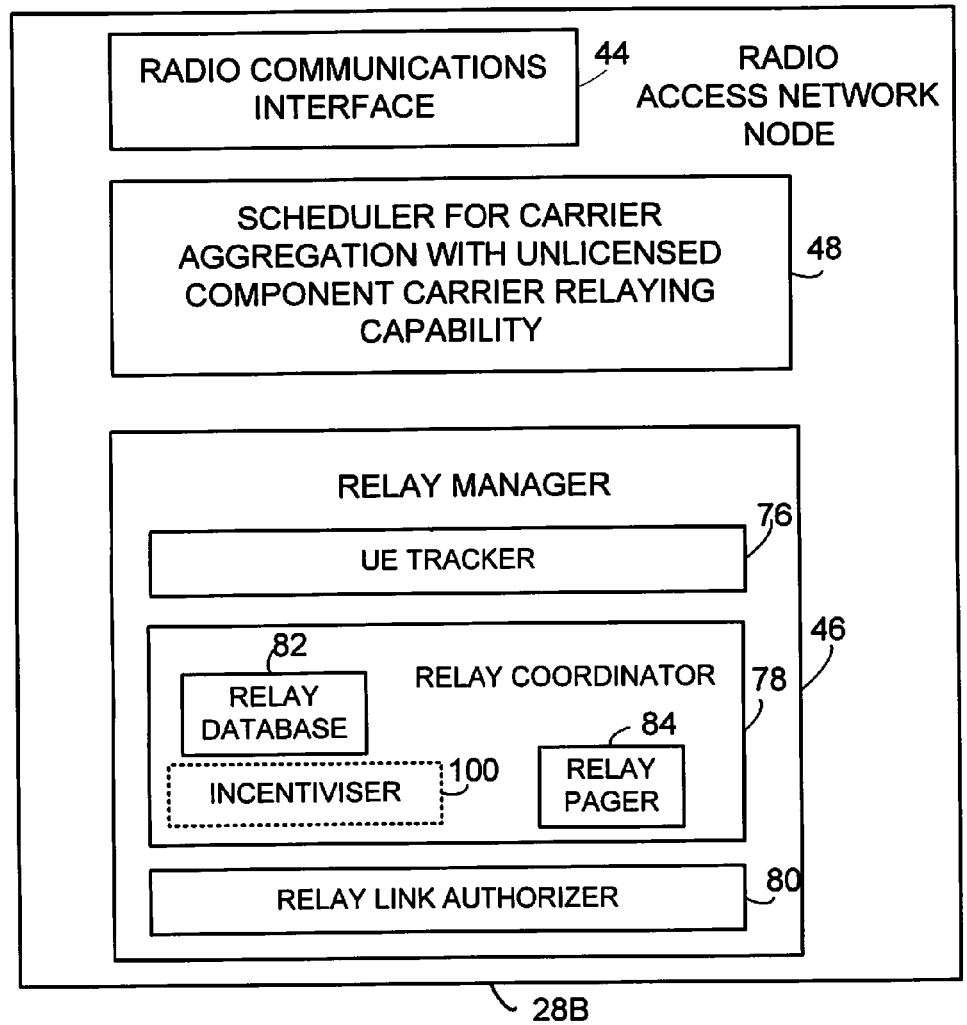
Figure 6C:
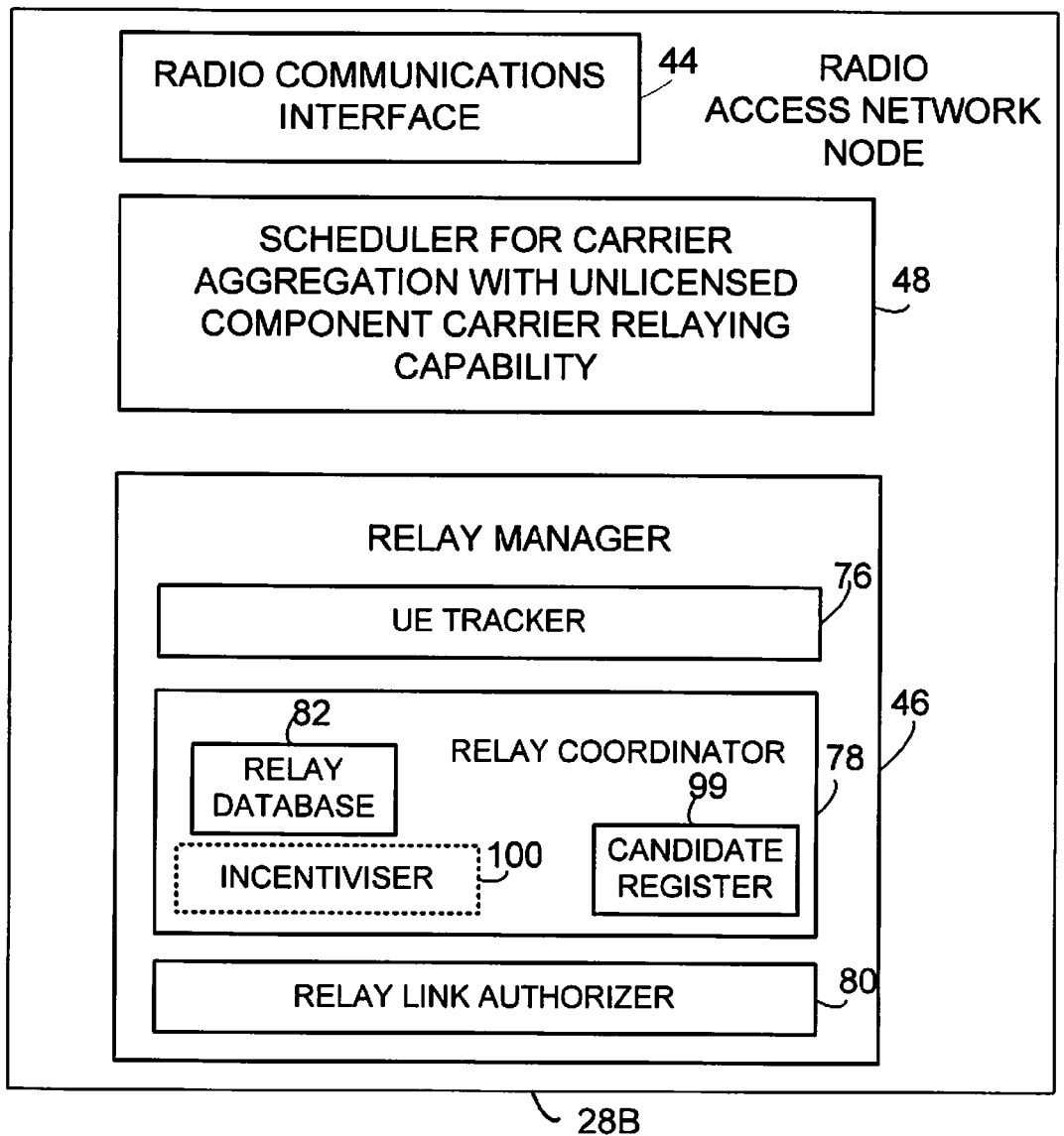

FIG. 6C illustrates an example implementation of a radio access network node 28 for modes in which a candidate relay node registers with radio access network node 28 in the manner depicted by FIG. 10. The relay coordinator 78 of the radio access network node 28 of FIG. 6C comprises candidate relay node register 99. Using candidate relay node register 99 the relay coordinator 78 receives and processes a registration message from a wireless terminal intending to register itself with the radio access network node 28 as a candidate for the relay node.

Figure 11:
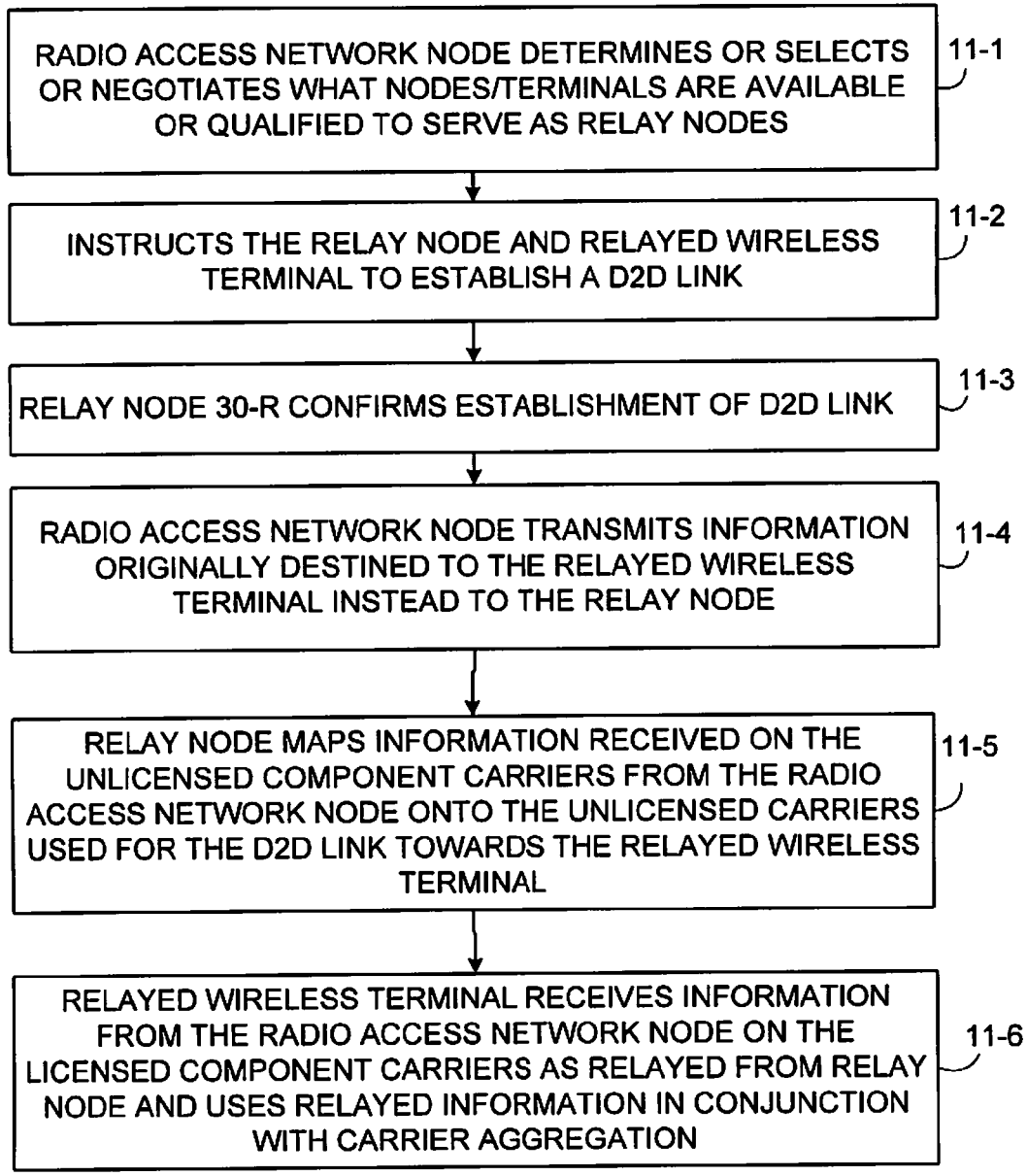
FIG. 11 is a flowchart illustrating example steps or acts of an example unlicensed component carrier relay setup procedure.

Described above are various ways in which the radio access network node 28 may determine or select what nodes (e.g., what wireless terminals) are available or qualified to serve as relay nodes. Such determination or selection is generically represented by act 11-1 in the overall unlicensed component carrier relay setup procedure of FIG. 11. Other representative acts or steps of the unlicensed component carrier relay setup procedure of FIG. 11 are discussed below.

In conjunction with relay node selection, in an example embodiment and mode the radio access network node 28 may optionally provide an incentive for a wireless device such as the second wireless terminal to serve as the relay node. Such incentive may be offered during the negotiation and/or authorized subsequent to selection. A mechanism for incentivization may be implemented using state of the art signaling mechanisms, such as Radio Resource Control (RRC) signaling, for example. The incentive may come in different forms, such as reduced charging or some "credits" that relay node 30-r may later use when wishing itself to use carrier aggregation outside the cell center area. Alternatively, the incentive may comprise offering some services free of charge or at reduced price, etc. To implementation such incentivization, the relay coordinator 78 may include an incentiviser 100 as shown in FIG. 6B. The optional nature of incentiviser 100 is depicted by its illustration with broken lines.

When the relay node 30-r has accepted the role of acting as a UE-r (as depicted by act 11-2 of FIG. 11), as act 11-2 the relay link authorizer 80 of radio access network node 28 instructs the relay node 30-r and wireless terminal 30-1 to establish a D2D link between each other. Establishment of the D2D link may be in accordance with prior art methods, such as disclosed in K. Doppler, M. Rinne, C. Wijting, C. B. Riberio and K. Hugl, "Device-to-device Communications as an Underlay to LTE-Advanced Networks", IEEE Communications Magazine, pp. 42-49, Vol. 47, No. 12, December 2009. After authorization of the D2D link, it is the responsibility of the relay node 30-r to confirm to the radio access network node 28 the establishment of the D2D link with the wireless terminal 30-1, as represented by act 11-3.

Once the radio access network node 28 has received a confirmation of the established D2D link between relay node 30-r and wireless terminal 30-1 (act 11-3), as act 11-4 the radio access network node 28 starts transmitting the information originally destined to wireless terminal 30-1 instead to relay node 30-r. For this purpose, either relay controller 62 or scheduler 64 of relay node 30-r comprises mapper 110 which serves (as act 11-5) to map information received on the unlicensed component carriers from the radio access network node 28 onto the unlicensed carriers used for the D2D link towards wireless terminal 30-1. As act 11-6 of FIG. 11, wireless terminal 30-1 thus continues to receive information from the radio access network node 28 on the licensed component carriers as relayed from relay node 30-1 even though the wireless terminal 30-1 is unable to receive the unlicensed component carriers directly from the radio access network node 28. Act 11-6 also comprises 30 Act 11-6 also comprises 30-1 performing carrier aggregation of the unlicensed component carrier and the licensed component carriers received by the wireless terminal 30-1.

In another of its aspects the technology disclosed herein concerns terminating or otherwise limiting a relaying service provided by the relay node 30-r. Such notification may be required, for example, if and when the D2D channel is no longer maintainable or if operation of the relay node 30-r require that the relay node-serving wireless terminal devote resources to its own operation (e.g., in furtherance of applications or services provided to its user) rather than in relaying of unlicensed component carriers. Hence, the D2D link may not be maintainable for various reasons.

In an example embodiment and mode, the relay node-serving wireless terminal 30-r notifies the radio access network node 28 when the relay node wireless terminal may no longer act as the relay node. Relay termination notification is depicted in conjunction with the example embodiment of FIG. 7C, in which relay controller 62 comprises relay sustainability monitor 112. In an example implementation the relay sustainability monitor 112 in turn may comprise, for example, one or more of battery monitor 114; owner usage monitor 116; relay link monitor 118, and/or any combination thereof.

The D2D operation involved in relaying the unlicensed component carriers consumes the battery power as well as processing at the UE-r. Moreover, at times the battery level of the relay node 30-r may fall below a threshold level, e.g., below a 50% level. Accordingly, using battery monitor 114 the relay node wireless terminal may notify the radio access network node 28 when a battery condition of the relay node wireless terminal precludes the second wireless terminal from acting as the relay node, so that relaying of the unlicensed component carriers to the wireless terminal 30-1 by relay node 30-r may be terminated or relinquished.

In some situations the D2D link may have to be terminated or its activity may have to be lowered significantly in case the subscriber of the relay node 30-r starts using more extensive features, which require that the relay node 30-r stop or significantly reduce D2D operations. The relay node 30-r needs to stop or reduce the D2D operations to ensure that the subscriber or the owner of the relay node 30-r obtains the desired service quality when using the terminal. Accordingly, using owner usage monitor 116 the relay node wireless terminal may notify the radio access network node 28 when a usage requirement or capability of the second wireless terminal precludes the second wireless terminal from acting as the relay node, so that relaying of the unlicensed component carriers to the wireless terminal 30-1 by relay node 30-r may be terminated or relinquished.

In yet other situations the radio conditions between relayed wireless terminal 30-1 and the relaying wireless terminal 30-r significantly deteriorates, e.g., signal quality falls below a prescribed threshold. In such cases either the D2D link should be terminated or activity level thereon be reduced. Accordingly, using relay link monitor 118 the relay node wireless terminal may notify the radio access network node 28 when a radio condition of a relay link between the second wireless terminal and the first wireless terminal precludes the second wireless terminal from acting as the relay node, so that relaying of the unlicensed component carriers to the wireless terminal 30-1 by relay node 30-r may be terminated or relinquished.

In yet other example embodiments and modes, the relay node-serving wireless terminal, also known as the second wireless terminal, may moderate rather than completely terminate its service as the relay node. As explained below, such moderation may occur by performing relay activity according to at least one of a moderated time pattern; a moderated data rate; and moderated data block size.

Figure 7A:
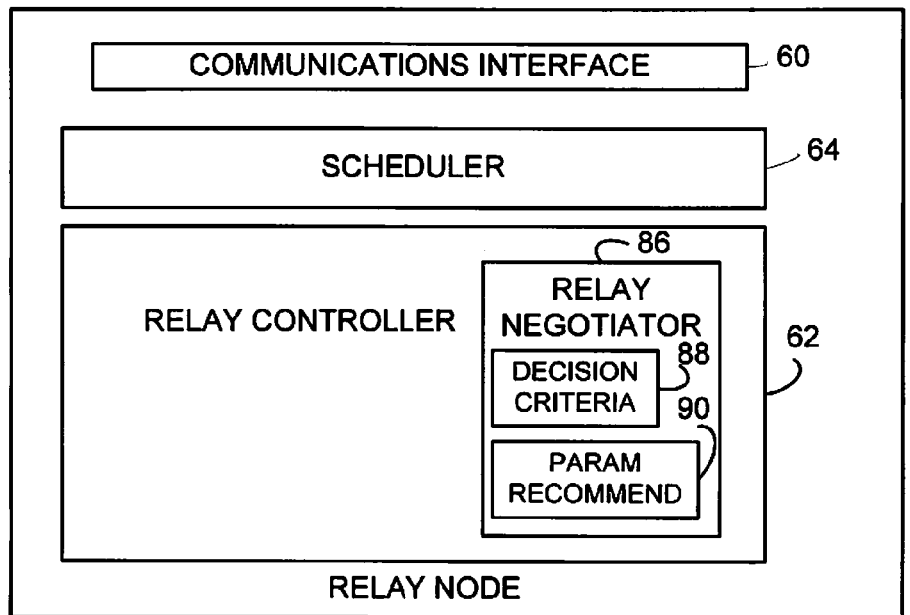
FIG. 7A-FIG. 7D are schematic views of other example embodiments and implementations of relay nodes.
Figure 7B:
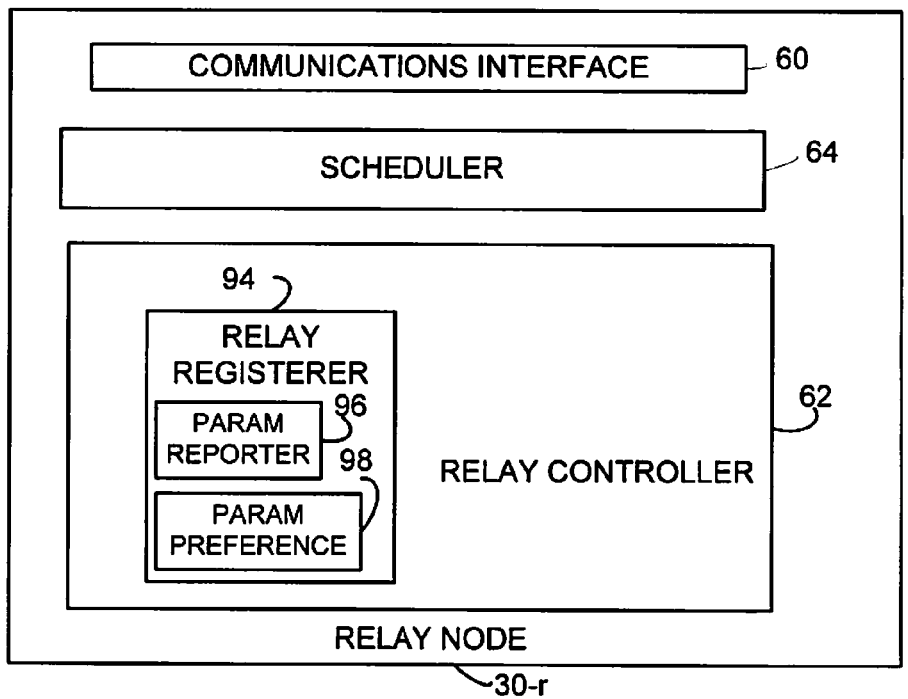
Figure 7C:
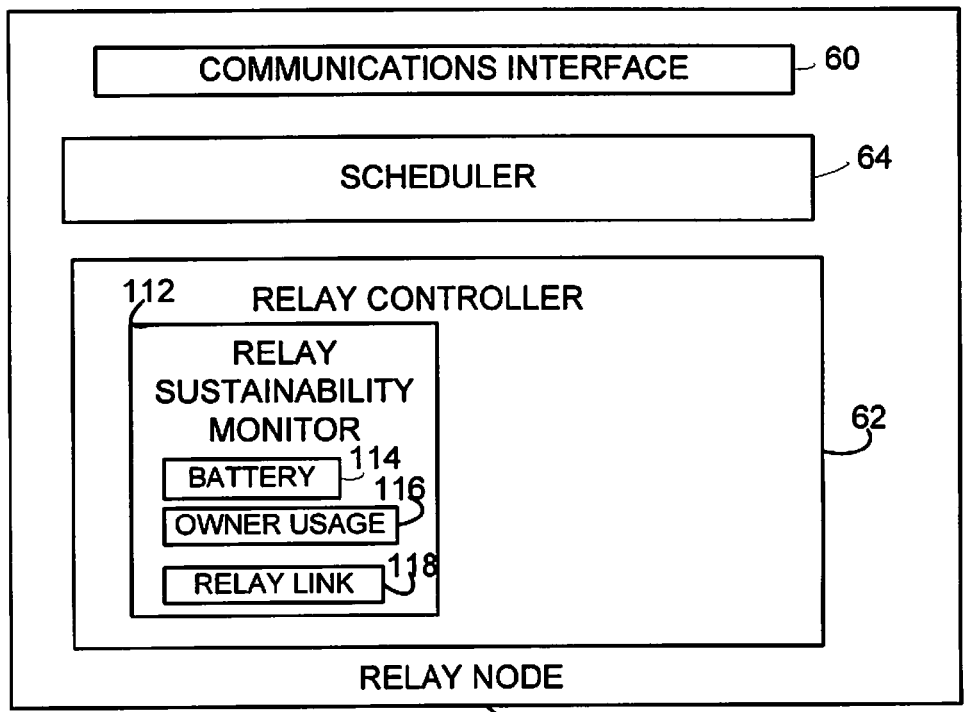
Figure 7D:
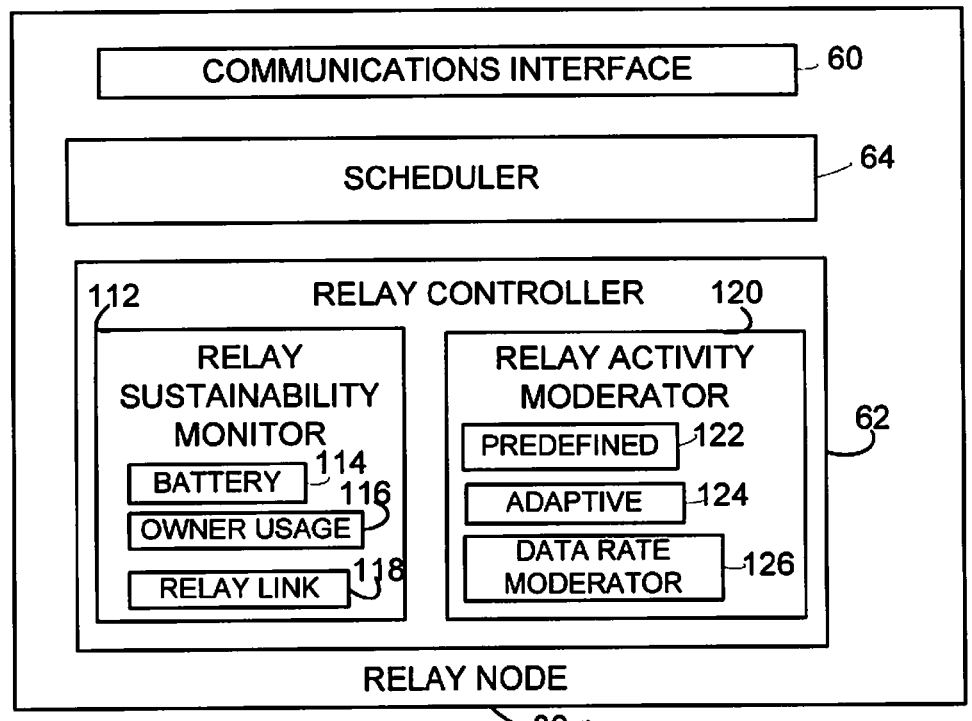

In terms of the architecture of relay node 30-r the relay service modification is depicted in conjunction with the example embodiment of FIG. 7D. As in the FIG. 7C embodiment, the relay controller 62 of the relay node 30-r may comprise relay sustainability monitor 112 with one or more of the potential constituent components shown in FIG. 7C. In addition, in the FIG. 7C embodiment the relay controller 62 also comprises relay activity moderator 120.

Figure 12A:
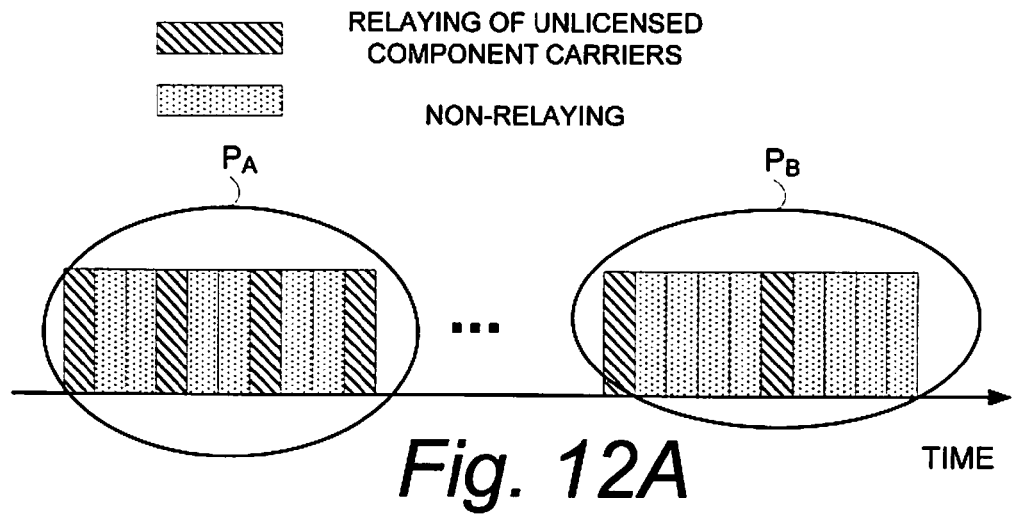
FIG. 12A and FIG. 12B are diagrammatic views illustrating example embodiments and modes of relay activity moderation.
Figure 12B:
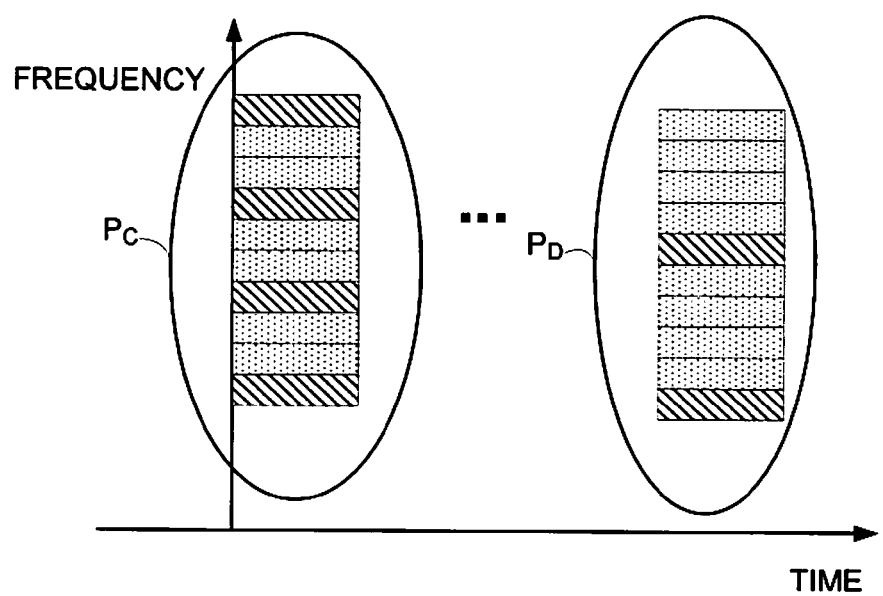

FIG. 12A and FIG. 12B illustrate example embodiments and modes of relay activity moderation. In an example time-based mode of FIG. 12A, at one point in time the relay node 30-r may start serving wireless terminal 30-1 by relaying unlicensed component carriers in accordance with a first (time) pattern of activity depicted as $P_A$, and then at a second (e.g., subsequent) point in time the relay node 30-r may change to serving wireless terminal 30-1 by relaying unlicensed component carriers in accordance with a second (time) pattern of activity such as depicted as $P_B$. In an example frequency-based mode of FIG. 12B, at one point in time the relay node 30-r may start serving wireless terminal 30-1 by relaying unlicensed component carriers in accordance with a first (frequency) pattern of activity depicted as $P_C$, and then at a second (e.g., subsequent) point in time the relay node 30-r may change to serving wireless terminal 30-1 by relaying unlicensed component carriers in accordance with a second (frequency) pattern of activity such as depicted as $P_D$. In FIG. 12A and FIG. 12B, the unlicensed component carrier resources allocated to the relaying activity are depicted by hatched resource units while resources not allocated to the relaying activity are depicted by stippled resource units. In FIG. 12A the first (time) pattern of activity depicted as $P_A$ involves providing every third time resource unit as a relaying unlicensed component carrier, which is subsequently moderated as reflected by the second (time) pattern of activity depicted as $P_B$ which involves providing every fourth time resource unit as a relaying unlicensed component carrier. Similarly, in FIG. 12B the first (frequency) pattern of activity depicted as $P_C$ involves providing every third frequency resource unit as a relaying unlicensed component carrier, which is subsequently moderated as reflected by the second (frequency) pattern of activity depicted as $P_D$ which involves providing every fourth frequency resource unit as a relaying unlicensed component carrier.

Thus, according to one alternative in order to operate at a lower activity level, the relay node 30-r may start serving wireless terminal 30-1 according to the pattern of activity ($P_A$). The pattern of activity for serving wireless terminal 30-1 may be in time as well as in frequency domain or both. This is similar to cellular systems discontinuous reception and transmission (DTX/DRX) cycle operation. However in the present example embodiment of the technology disclosed herein the objective of the pattern differs in that it ensures the relay node 30-r is able to wireless terminal 30-1 via the D2D link at least with reduced transmission/reception activity level.

In an example implementation illustrated in FIG. 7C relay activity moderator 120 in turn comprises one or more of predetermined activity pattern regulator 122; adaptive activity pattern regulator 124; and data rate activity pattern regulator 126, each of which is explained below.

In the above regard, one or more of the patterns such as pattern (PA) may be one of several possible pre-defined patterns stored in or managed by predetermined activity pattern regulator 122. When using a predetermined activity pattern it is possible that only a pattern identifier need be signaled to or configured at the wireless terminal 30-1 and relay node 30-r by the deciding node, e.g., by radio access network node 28. Otherwise, more detailed parameters associated with the pattern including for example the periodicity of the activity, active and inactive time in each period, total duration of the pattern, etc., needs to be configured at wireless terminal 30-1 and relay node 30-r by the desired network node, e.g., by radio access network node 28.

Further, using data rate activity pattern regulator 126, one or more of the activity patterns may be with limited data rate and/or data block size below its maximum capability over certain duration of time. In such case, the relay node 30-r is still able to transmit with full activity (i.e. continuously or almost continuously) but with limited data rate and/or data block size below its maximum capability over certain duration of time.

In the case of lack of activity between wireless terminal 30-1 and relay node 30-r over a period of time (T2), then the relay node 30-r may starts serving wireless terminal 30-1 with reduced activity, e.g., according to one of the pre-defined patterns as explained above.

In addition to the above actions, radio access network node 28 may also pre-configure the D2D link between relay node 30-r and wireless terminal 30-1 and maintain this link over a period of time (T3) or until the relay node 30-r is unable to serve the wireless terminal 30-1 even in case the relay node 30-r moves inside the inner coverage area of the cell. The radio access network node 28 may use lower layer signaling to quickly activate and deactivate the D2D link between relay node 30-r and wireless terminal 30-1. This feature is useful when for example the wireless terminal 30-1 moves back and forth between the inner and outer coverage areas of the cell.

Figure 13:
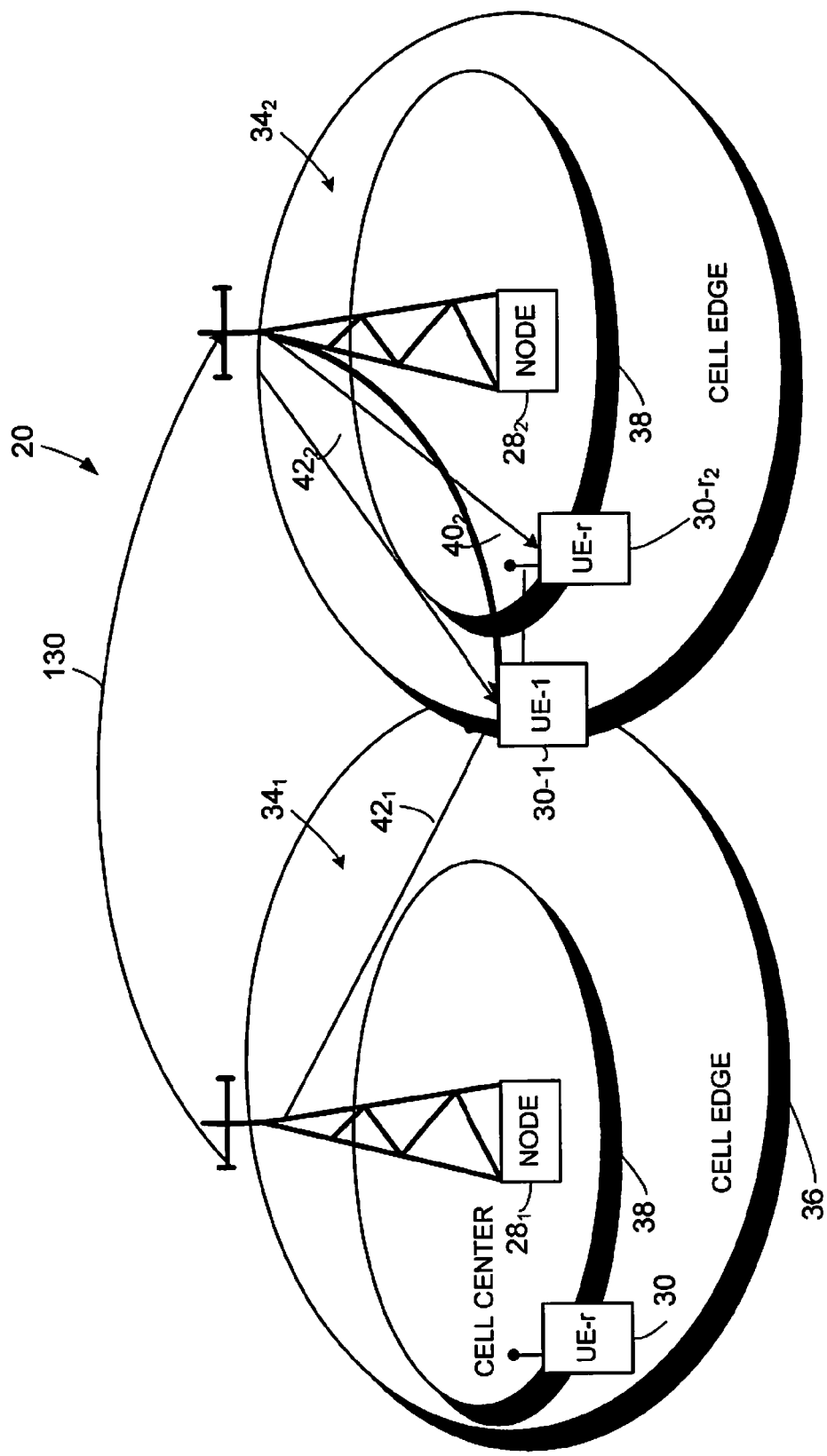
FIG. 13 is a diagrammatic view depicting an example embodiment and mode wherein a radio access network node hands over a wireless terminal when the radio access network node may only find a relay node served by another radio access network node.

In another example embodiment and mode illustrated in FIG. 13, should a radio access network node 28 not find a proper candidate relay node for a particular wireless terminal (e.g., for wireless terminal 30-1), the radio access network node 28 may consult another node such as a neighbor node, for example. In this respect, FIG. 13 depicts wireless terminal 30-1 near the edge of cell 34$_1$ served by radio access network node 28$_1$ and capable of receiving licensed component carriers 42 from radio access network node 28$_1$ in conjunction with carrier aggregation. But radio access network node 28$_1$ has no eligible relay node directly served by radio access network node 28$_1$ for sending unlicensed component carriers to wireless terminal 30-1. In such case, as depicted by arrow 130 of FIG. 13, radio access network node 28$_1$ sends signals (corresponding to information which need to be carried by the unlicensed component carriers allocated to wireless terminal 30-1 for carrier aggregation) to another (e.g., neighboring) radio access network node 28$_2$. The neighboring radio access network node 28$_2$ then determines whether it may locate a wireless terminal served by radio access network node 28$_2$ to qualify as a competent relay node to relay unlicensed component carriers to wireless terminal 30-1. In the particular situation shown in FIG. 13, relay node 30-r2 (served by radio access network node 28$_2$) does qualify and is willing to serve as a relay node for wireless terminal 30-1. Accordingly, FIG. 13 shows wireless terminal 30-1 being handed over to radio access network node 28$_2$ and the unlicensed component carriers 40$_2$ being routed from radio access network node 28$_2$ through relay node 30-r2 to wireless terminal 30-1. As a result of the handover, wireless terminal 30-1 then receives licensed component carriers 42$_2$ for carrier aggregation from the radio access network node 28$_2$. Thus, if the neighbor radio access network node 28$_2$ has a proper relay node such as relay node 30-r2, the wireless terminal 30-1 is handed over to the neighbor radio access network node 28$_2$. In other words, the radio access network node 28$_1$ may hand the first wireless terminal 30-1 over to another radio access network node 28$_2$ when the radio access network node 28$_1$ cannot located a candidate relay node served by the radio access network node 28$_1$, but the another radio access network node 28$_2$ may locate a relay node for relaying unlicensed component carriers to the first wireless terminal 30-1.

According to another embodiment, as a general rule the mobility decision is based on measurements from the carrier belonging to a licensed band (B1). The reason is that higher maximum power is possible in licensed band (B1) compared to that on the unlicensed band (B2). The higher max power on B1 ensures better mobility performance, e.g., when mobility decisions are based on measurements done on B1. By contrast, in a prior art system mobility is based on anchor/primary carrier.

In another embodiment the anchor carrier always belongs to a licensed band (B1). This does not necessarily mean that the mobility is based on the anchor carrier.

According to another embodiment the wireless terminal is assigned the anchor carrier on licensed band (B1) when it moves in the outer cell coverage even if unlicensed band (B2) is a lower operating frequency; higher B1 max power will ensure better coverage. On the other hand when the wireless terminal is in the inner coverage zone, the eNB may assign either B1 or B2 as the anchor/primary carrier to a wireless terminal to prevent the situation whereby B1 becomes overloaded.

Figure 14:
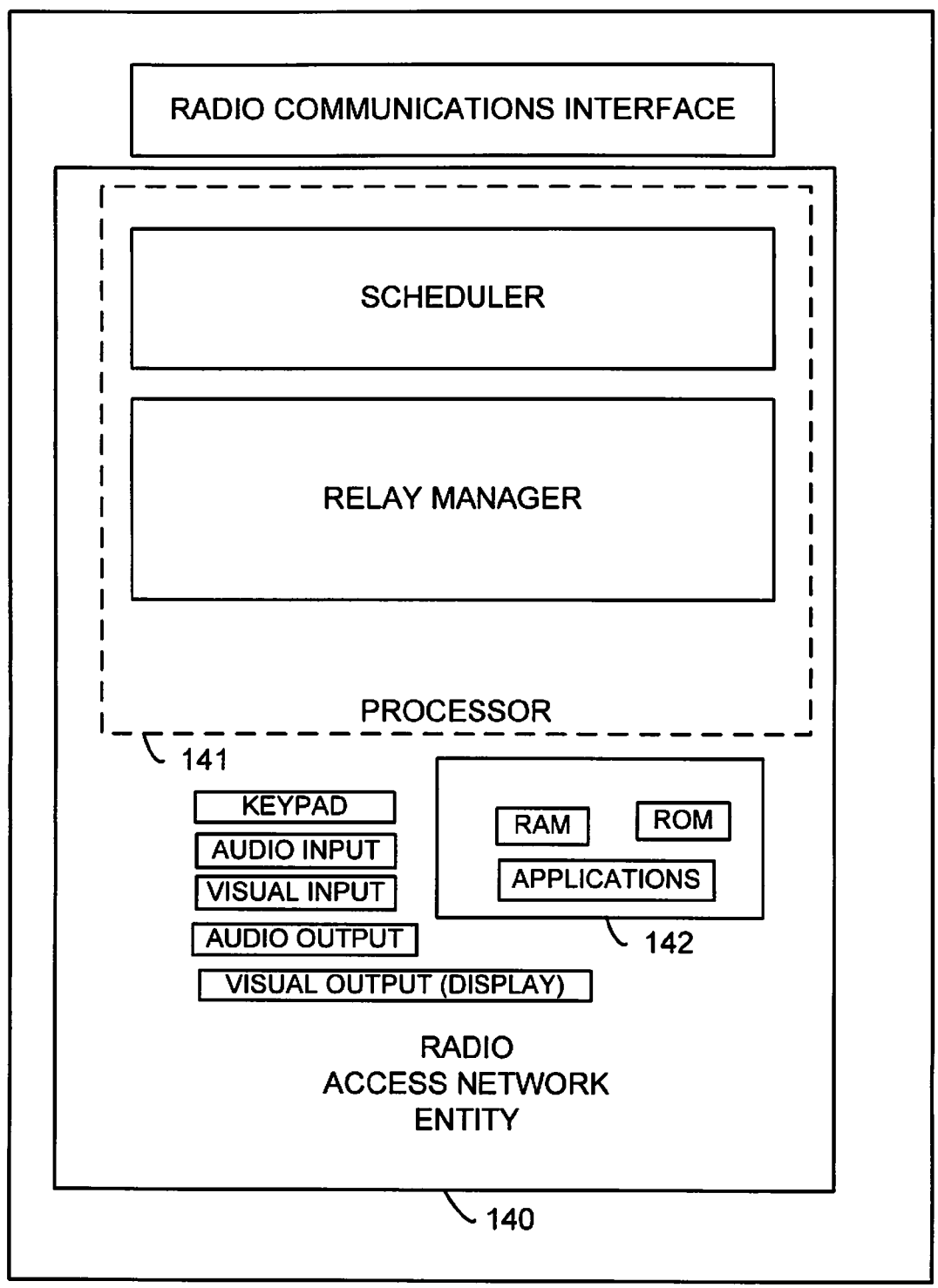
FIG. 14 is a schematic view of a generic radio access network entity which is realized by machine implementation.

Various functions and units of each of the radio access network node 28, wireless terminal 30-1, and relay node may be machine implemented, as generically represented by FIG. 14. In particular, FIG. 14 represents a generic radio access network entity, which could be any of radio access network node 28, relay node 30-r, or wireless terminal 30-1. The generic radio access network entity is shown as comprising in common a communications interface, a scheduler, and some type of relay entity. Counterparts and details of differing embodiments of each of these units and functionalities have already been described with reference, e.g., to preceding figures. FIG. 14 further shows that each of these scheduler and relay entity functionalities may, among other units and functionalities, be realized by and/or provided on a platform 140. The terminology "platform" is a way of describing how the functional units of a communications unit or node may be implemented or realized by machine.

In one example implementation, the functionalities shown as framed by platform 60, including but not limited to the scheduling unit and the relay entity, and even other functionalities, may be realized by one or more processors 141 which execute coded instructions stored in memory (e.g., non-transitory signals) in order to perform the various acts described herein. In such a computer implementation the network entity may comprise, in addition to a processor(s), a memory section 142 (which in turn may comprise random access memory; read only memory; application memory (which stores, e.g., coded instructions which may be executed by the processor to perform acts described herein); and any other memory such as cache memory, for example).

Whether or not specifically illustrated, typically the network entity of FIG. 14 (and thus potentially of each of the embodiments discussed herein) may also comprise certain input/output units or functionalities, the representative input/output units for wireless terminal being illustrated in FIG. 14 as a keypad; an audio input device (e.g. microphone); a visual input device (e.g., camera); a visual output device (e.g., display); and an audio output device (e.g., speaker). Other types of input/output devices may also be connected to or comprise the network entity of FIG. 14.

In the example of FIG. 14 the platform 140 has been illustrated as computer-implemented or computer-based platform. Another example platform 140 for the network entity of FIG. 14 may be that of a hardware circuit, e.g., an application specific integrated circuit (ASIC) wherein circuit elements are structured and operated to perform the various acts described herein.

The relaying techniques, node and terminal architectures, features, and method acts of the differing embodiments described above may be variously combined, so that it should be understood that no particular embodiment or mode necessarily be unique to itself but may be augmented with aspects described in conjunction with other embodiments and modes.

Representative but non-exclusive features of interest of the technology disclosed herein thus encompass the following:

A method whereby the user equipment (UE-r) acts as a relay node for unlicensed component carriers and transmits data to another UE (UE-1) performing carrier aggregation.

A method whereby the wireless terminal 30-1 receives data on unlicensed component carriers from another wireless terminal, e.g., relay node 30-r, and licensed component carriers from a cellular base station and performs carrier aggregation of the received unlicensed and licensed component carriers.

A method whereby the base station uses a modified paging message to search for candidate relay user equipments.

A method whereby a user equipment receives and decodes the modified paging message of the base station and identifies itself as a candidate relay user equipment.

A method whereby a user equipment receives and decodes the modified paging message of the base station and identifies itself as a candidate relay user equipment.

A method whereby a user equipment registers itself with associated parameters at a database containing data of candidate relay user equipments.

Although the description above contains many specificities, these should not be construed as limiting the scope of the invention but as merely providing illustrations of some of the presently preferred embodiments of this invention. It will be appreciated that the scope of the present invention fully encompasses other embodiments which may become obvious to those skilled in the art, and that the scope of the present invention is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the present invention, for it to be encompassed hereby.

What is claimed is:

1. A method of operating a radio access network having a radio access network node and plural wireless terminals, wherein a first wireless terminal is configured to utilize mixed carrier aggregation, the mixed carrier aggregation comprising licensed component carriers and unlicensed component carriers, the method comprising:
   the radio access network node sending a paging message to the plural wireless terminals to locate a candidate wireless terminal to serve as a relay node, wherein the paging message includes information regarding a required data rate for relaying between the radio access network node and the first wireless terminal, and an expected time period to serve as the relay node;
   the radio access network node receiving a response message from the candidate wireless terminal agreeing to serve as the relay node;
   interfacing the candidate wireless terminal as the relay node with the radio access network node and with the first wireless terminal; and
   utilizing the relay node as a relay to transmit uplink and downlink data over a wireless interface between the radio access network node and the first wireless terminal using an unlicensed component carrier;
   wherein the first wireless terminal receives the downlink data from the relay node on the unlicensed component carrier, receives additional downlink data from the radio access network node on a licensed component carrier, and the first wireless terminal performs carrier aggregation of the unlicensed component carrier and the licensed component carrier received by the first wireless terminal.

2. The method of claim 1, further comprising performing carrier aggregation using the unlicensed component carrier.

3. The method of claim 1, further comprising:
   the first wireless terminal:
      transmitting the uplink data to the relay node on the unlicensed component carrier; and
      transmitting additional uplink data to the radio access network node on a licensed component carrier;
   the relay node transmitting the unlicensed component carrier to the radio access network node; and
   the radio access network node performing carrier aggregation of the unlicensed component carrier and the licensed component carrier.

4. The method of claim 1, wherein the relay node is a second wireless terminal, and the method further comprises the second wireless terminal:
   receiving the downlink data from the radio access network node on an unlicensed component carrier allocated to the second wireless terminal;
   receiving additional downlink data from the radio access network node on a licensed component carrier allocated to the second wireless terminal;
   performing carrier aggregation of the unlicensed component carrier and the licensed component carrier allocated to and received by the second wireless terminal; and
   transmitting the unlicensed component carrier allocated to the first wireless terminal to the first wireless terminal.

5. The method of claim 1, further comprising a wireless terminal registering itself with the radio access network node as a candidate for the relay node.

6. The method of claim 1, wherein the relay node comprises a second wireless terminal, and wherein the method further comprises the radio access network node providing an incentive for the second wireless terminal to serve as the relay node.

7. The method of claim 1, wherein the relay node comprises a second wireless terminal, and wherein the method further comprises the second wireless terminal notifying the radio access network node when the second wireless terminal may no longer act as the relay node.

8. The method of claim 1, wherein the relay node comprises a second wireless terminal, and wherein the method further comprises the second wireless terminal moderating its service as the relay node by performing relay activity according to at least one of:
   a moderated time pattern;
   a moderated data rate; and
   a moderated data block size.

9. The method of claim 1, wherein the relay node comprises a second wireless terminal, and wherein the method further comprises the radio access network node handing the first wireless terminal over to another radio access network node when the radio access network node cannot locate a candidate relay node served by the radio access network node, and the other radio access network node is configured to locate a relay node for relaying unlicensed component carriers to the first wireless terminal.

10. The method of claim 1, further comprising using a same unlicensed component carrier that is used to transmit the uplink and downlink data between the radio access network node and the relay node to also transmit the uplink and downlink data between the relay node and the first wireless terminal.

11. The method of claim 1, further comprising using a different unlicensed component carrier to transmit the uplink and downlink data between the radio access network node and the relay node than is used to transmit the uplink and downlink data between the relay node and the first wireless terminal.

12. The method of claim 7, wherein the relay node comprises a second wireless terminal, and wherein the method further comprises the second wireless terminal notifying the radio access network node when one of the following precludes the second wireless terminal from acting as the relay node
   (1) a battery condition of the second wireless terminal;
   (2) a usage requirement or capability of the second wireless terminal; and
   (3) a radio condition of a relay link between the second wireless terminal and the first wireless terminal.

13. A radio access network node comprising:
   a communication interface configured to facilitate communication across a radio interface with plural wireless terminals including a first wireless terminal and a second wireless terminal, each of the wireless terminals being configured to use mixed carrier aggregation, the mixed carrier aggregation comprising licensed component carriers and unlicensed component carriers;
   a relay pager configured to send a paging message to the second wireless terminal to determine whether the second wireless terminal will serve as a relay node between the radio access network node and the first wireless terminal, wherein the paging message includes information regarding a required data rate for relaying between the radio access network node and the first wireless terminal, and an expected time period to serve as the relay node; and
   a scheduler and relay manager configured to enable the second wireless terminal to act as a relay node and thereby transmit uplink and downlink data between the radio access network node and the first wireless terminal using an unlicensed component carrier,
   wherein the first wireless terminal receives the downlink data from the relay node on the unlicensed component carrier, receives additional downlink data from the radio access network node on a licensed component carrier, and the first wireless terminal performs carrier aggregation of the unlicensed component carrier and the licensed component carrier received by the first wireless terminal.

14. The radio access network node of claim 13, wherein the scheduler is further configured to allocate the unlicensed component carrier to the first wireless terminal and to allocate a licensed component carrier to the first wireless terminal.

15. The radio access network node of claim 13, wherein the communication interface is further configured to receive and process a registration message from a wireless terminal intending to register itself with the radio access network node as a candidate for the relay node.

16. The radio access network node of claim 13, further configured to send to the second wireless terminal, information regarding an incentive for the second wireless terminal to serve as the relay node.

17. A relay node in a radio access network, the relay node comprising:
   a communication interface configured to receive a paging message from a radio access network node querying whether the relay node will serve as a relay node between the radio access network node and a first wireless terminal, wherein the paging message includes information regarding a required data rate for relaying between the radio access network node and the first wireless terminal, and an expected time period to serve as the relay node;
   a relay negotiator configured to respond to the radio access network node that the relay node will serve as the relay node for the first wireless terminal;
   wherein the communication interface is further configured to facilitate communication across a radio interface with the radio access network node and the first wireless terminal, the first wireless terminal being configured to use mixed carrier aggregation, the mixed carrier aggregation comprising licensed component carriers and unlicensed component carriers; and
   a scheduler and relay controller configured to relay uplink and downlink data between the radio access network node and the first wireless terminal using an unlicensed component carrier allocated by the radio access network node to the first wireless terminal,
   wherein the first wireless terminal receives the downlink data from the relay node on the unlicensed component carrier, receives additional downlink data from the radio access network node on a licensed component carrier, and the first wireless terminal performs carrier aggregation of the unlicensed component carrier and the licensed component carrier received by the first wireless terminal.

18. The relay node of claim 17, wherein the relay node is a second wireless terminal, and the relay controller is further configured to:
   process the uplink and downlink data received on an unlicensed component carrier allocated to the second wireless terminal;
   process downlink data received from the radio access network node on a licensed component carrier allocated to the second wireless terminal; and perform carrier aggregation of the unlicensed component carrier allocated to the second wireless terminal and the licensed component carrier allocated to the second wireless terminal.

19. The relay node of claim 17, wherein the relay node is a second wireless terminal and the relay controller is further configured to register the relay node with the radio access network node as a candidate for the relay node.

20. The relay node of claim 17, wherein the relay controller is further configured to notify the radio access network node when the relay node may no longer act as the relay node.

21. The relay node of claim 17, wherein the relay node is a second wireless terminal, and the relay controller is further configured to moderate service by the second wireless terminal as the relay node by performing relay activity according to at least one of:
   a moderated time pattern;
   a moderated data rate; and
   a moderated data block size.

22. The relay node of claim 20, wherein the relay node is a second wireless terminal, and the relay controller is further configured to notify the radio access network node when one of the following precludes the second wireless terminal from acting as the relay node:
   (1) a battery condition of the relay wireless terminal;
   (2) a usage requirement of the relay wireless terminal; and
   (3) a condition of a relay link between the relay wireless terminal and the first wireless terminal.

* * * * *